(12) United States Patent
Kabeya et al.

(10) Patent No.: US 10,233,317 B2
(45) Date of Patent: Mar. 19, 2019

(54) FIBER-REINFORCED FLAME-RETARDANT POLYPROPYLENE RESIN COMPOSITION AND MOLDED ARTICLE USING THE SAME

(71) Applicant: JAPAN POLYPROPYLENE CORPORATION, Tokyo (JP)

(72) Inventors: Masayuki Kabeya, Mie (JP); Kazunobu Nakamori, Mie (JP); Itsushi Imamura, Mie (JP)

(73) Assignee: JAPAN POLYPROPYLENE CORPORATION, Tokyo (JP)

( * ) Notice: Subject to any disclaimer, the term of this patent is extended or adjusted under 35 U.S.C. 154(b) by 0 days.

(21) Appl. No.: 15/515,405

(22) PCT Filed: Oct. 1, 2014

(86) PCT No.: PCT/JP2014/076330
§ 371 (c)(1),
(2) Date: Mar. 29, 2017

(87) PCT Pub. No.: WO2016/051562
PCT Pub. Date: Apr. 7, 2016

(65) Prior Publication Data
US 2017/0218189 A1 Aug. 3, 2017

(51) Int. Cl.
*C08L 23/12* (2006.01)
*C08J 5/00* (2006.01)
*C08K 5/49* (2006.01)
*C08K 7/04* (2006.01)
*C08L 27/18* (2006.01)
*C09K 21/12* (2006.01)

(52) U.S. Cl.
CPC ............... *C08L 23/12* (2013.01); *C08J 5/00* (2013.01); *C08K 5/49* (2013.01); *C08K 7/04* (2013.01); *C08L 27/18* (2013.01); *C09K 21/12* (2013.01); *C08L 2201/02* (2013.01); *C08L 2205/025* (2013.01); *C08L 2205/03* (2013.01)

(58) Field of Classification Search
CPC .......... C08L 9/06; C08L 9/00; C08L 2205/02; C08L 2205/03; C08L 23/10; C08L 23/12; C08K 13/02; C08K 7/02; C08K 5/0066; C08K 3/22; C08K 5/16; C08K 7/06; C08J 5/042; C08J 5/043
See application file for complete search history.

(56) References Cited

U.S. PATENT DOCUMENTS

| | | | |
|---|---|---|---|
| 2003/0088000 A1 | 5/2003 | Kimura et al. | |
| 2008/0214715 A1* | 9/2008 | Costanzi ........... | C08K 5/02 524/414 |
| 2014/0309350 A1 | 10/2014 | Kabeya et al. | |
| 2015/0004394 A1 | 1/2015 | Hotta et al. | |

FOREIGN PATENT DOCUMENTS

| | | |
|---|---|---|
| JP | 10-338774 A | 12/1998 |
| JP | 2003-026935 A | 1/2003 |
| JP | 2009-275073 A | 11/2009 |
| JP | 2009-299025 A | 12/2009 |
| JP | 2011-088970 A | 5/2011 |
| JP | 2013-108070 A | 6/2013 |
| JP | 2013-194077 A | 9/2013 |
| JP | 2013-199644 A | 10/2013 |
| JP | 2014-172985 A | 9/2014 |

OTHER PUBLICATIONS

Extended European Search Report from European Patent Application No. 14903247.6 dated Jun. 29, 2017.
International Search Report issued with respect to Application No. PCT/JP2014/076330, dated Oct. 28, 2014.
International Preliminary Report on Patentability issued with respect to Application No. PCT/JP2014/076330, dated Apr. 4, 2017.

* cited by examiner

*Primary Examiner* — Nathan M Nutter
(74) *Attorney, Agent, or Firm* — Greenblum & Bernstein, P.L.C.

(57) ABSTRACT

Provided are a polypropylene resin composition comprising a polypropylene resin (A), a specific fiber (B), an organic flame retardant (C) and a polytetrafluoroethylene resin (D) each in a specific amount, and a molded article obtained by molding the composition.

5 Claims, No Drawings

FIBER-REINFORCED FLAME-RETARDANT POLYPROPYLENE RESIN COMPOSITION AND MOLDED ARTICLE USING THE SAME

TECHNICAL FIELD

The present invention relates to a fiber-containing flame-retardant polypropylene resin composition, and more precisely, to a flame-retardant polypropylene resin composition containing a polypropylene resin and a polytetrafluoroethylene resin (hereinafter this may be abbreviated as PTFE), and an organic flame retardant such as a phosphorus-containing flame retardant or the like and a fiber each in a specific amount, and preferably further containing a specific amount of a polypropylene resin having a specific long-chain branched structure.

BACKGROUND ART

For obtaining flame-retardant polypropylenes, it is widely carried out to add a flame-retardant composition containing a halogen flame retardant and an antimony compound to various types of polypropylene resin. This is advantageous in that the flame-retardant composition can exhibit flame retardance even when used in a relatively small amount, and hardly detracts from the advantageous performance of polypropylene resins.

However, in a case where such flame-retardant compositions are used, there occurs a problem that a halogen gas is generated in combustion, and therefore use of a halogen-free, that is, so-called non-halogen flame retardant has become investigated.

Regarding the evaluation standards for flame retardance, it is desired that resins themselves are hardly flammable (so-called, self-extinguishing property) and that, in addition thereto, firing or melting resins do not drip or do not drip to spread to fire other substances (so-called drip resistance or drip protection), and recently, a higher flame-retardant level satisfying both self-extinguishing property and drip resistance has become desired.

The recent tendency in the field of automobiles is toward electric vehicles (EV) and hybrid electric vehicles (HEV) and that in the field of home electric appliances is toward induction-heating cookers (IH), and for automobile parts and home electric appliance parts, high-level flame retardance of "V-0" in "UL Standards (US Underwriters Laboratories Standards)-94V" has become desired. In addition, flame-retarding technology in large-size members is being advanced, and flame retardance specialized in self-extinguishing property and drip resistance in a higher level than before is being required. Such flame retardance satisfies an extremely high-level standard of "5VA" in "UL94-5V".

As in the above, flame-retardant materials are desired for automobile and home electric appliance materials, and these flame-retardant materials are also desired to have mechanical properties on the same level as that of conventional non-flame-retardant materials. Specifically, at present, materials capable of giving an extremely high-level flame retardant effect and capable of satisfying mechanical properties (rigidity, impact), weather resistance and moldability are desired.

PTL 1 describes a flame-retardant resin composition having improved flame retardance by adding a small amount of tetrafluoroethylene resin (PTFE) to a thermoplastic resin to express an effect of drip protection (drip resistance) in firing the thermoplastic resin.

PTLs 2 and 3 describes a technique of imparting mechanical properties, flame retardance and weather resistance by adding glass fibers to a flame-retardant material using a polyolefin and a nitrogen-containing phosphate.

CITATION LIST

Patent Literature

PTL 1: JP-A 2003-026935
PTL 2: JP-A 2011-088970
PTL 3: JP-A 10-338774

SUMMARY OF INVENTION

Technical Problem

However, when flame retardance is desired to be maintained using the technology described in PTL 1, there would be a risk of degradation of mechanical properties owing to the added PTFE, while on the other hand, when the mechanical properties are desired to be maintained, the amount of PTFE to be added must be minimized. As a result, reduction in flame retardance is inevitable owing to the reduction in the amount of PTFE added, and it is difficult to maintain flame retardance without degrading the mechanical properties.

According to the technique described in PTLs 2 and 3, it is possible to relatively increase the concentration of the flame retardant in the resin by adding glass fibers to express a self-extinguishing effect, but by adding glass fibers having a large specific gravity, the resin would readily drip during firing, and it is difficult to express high drip resistance.

An object of the present invention is to provide a flame-retardant polypropylene resin composition capable of expressing extremely high flame retardance to attain 5 VA in UL94-5V by satisfying both self-extinguishing property and drip resistance and given mechanical properties (rigidity, impact), weather resistance and moldability, which, however, has been difficult to attain according to an already-existing technique, and to provide a molded article using the composition.

Solution to Problem

The present inventors have assiduously studied for solving the above-mentioned problems, and, as a result, have found that, by combining a polypropylene resin and a polytetrafluoroethylene resin along with an organic flame retardant, especially a non-halogen flame retardant such as a phosphorus-containing flame retardant or the like and a fiber each in a specific amount, and preferably by further adding a polypropylene resin having a specific long-chain branched structure thereto, a flame-retardant polypropylene resin composition capable of expressing extremely high flame retardance (5 VA in UL94-5V) firing by satisfying both self-extinguishing property and drip resistance and given mechanical properties (rigidity, impact), weather resistance and moldability, can be obtained, and have completed the present invention.

Specifically, according to the first aspect of the present invention, there is provided a polypropylene resin composition comprising: a polypropylene resin (A) satisfying the following requirements (A-1) and (A-2); a fiber (B) satisfying the following requirement (B-1); an organic flame retardant (C); and a polytetrafluoroethylene (D), the polypropylene resin composition satisfying the following requirement (I).

Requirement (A-1):

The polypropylene resin (A) contains a polypropylene resin (Y) having the following characteristics (Y-i) to (Y-ii), Characteristic (Y-i): At least one polypropylene resin selected from a group consisting of a propylene homopolymer, a propylene-α-olefin block copolymer and a propylene-α-olefin random copolymer, which does not correspond to the following polypropylene resin (X) having a long-chain branched structure, Characteristic (Y-ii): The polypropylene resin (Y) has a melt flow rate (MFR) (230° C., 2.16 kg load) of from 1.0 to 200 g/10 min, Requirement (A-2):

The polypropylene resin (A) contains at least one polypropylene resin selected from a group consisting of the above polypropylene resin (Y) and a polypropylene resin (X) having a long-chain branched structure having the following characteristics (X-i) to (X-iv), Characteristic (X-i): The melt flow rate (MFR) (230° C., 2.16 kg load) is from 0.1 to 30.0 g/10 min, Characteristic (X-ii): The Molecular weight distribution Mw/Mn through GPC is from 3.0 to 10.0 and Mz/Mw through GPC is from 2.5 to 10.0, Characteristic (X-iii): The melt tension (MT) (unit: g) satisfies any of the following:

$$\log(MT) \geq -0.9 \times \log(MFR) + 0.7 \text{ or } MT \geq 15,$$

Characteristic (X-iv): The amount of paraxylene-soluble fraction (CXS) at 25° C. is less than 5.0% by weight relative to the total amount of the polypropylene resin (X), Requirement (B-1):

The fiber (B) is at least one type selected from a group consisting of a glass fiber and a carbon fiber, Requirement (I):

The content of each component falls within a range that the polypropylene resin (A) is from 20 to 77 parts by weight, the fiber (B) is from 5 to 40 parts by weight, and the organic flame retardant (C) is from 18 to 40 parts by weight (provided that the total content of the polypropylene resin (A), the fiber (B) and the organic flame retardant (C) is 100 parts by weight), and the polytetrafluoroethylene resin (D) is from 0.01 to 1.5 parts by weight relative to 100 parts by weight of the total content of the polypropylene resin (A), the fiber (B) and the organic flame retardant (C).

According to the second aspect of the present invention, there is provided the polypropylene resin composition of the first aspect of the invention, wherein the polypropylene resin (A) further satisfies the following requirement (A-3), Requirement (A-3):

The polypropylene resin (A) contains the polypropylene resin (Y) and the polypropylene resin (X) having a long-chain branched structure, and the ratio thereof is that the polypropylene resin (Y) is from 70 to 99% by weight and the polypropylene resin (X) having a long-chain branched structure is from 1 to 30% by weight (provided that the total of the polypropylene resin (Y) and the polypropylene resin (X) having a long-chain branched structure is 100% by weight).

According to the third aspect of the present invention, there is provided the polypropylene resin composition of the first or second aspect of the invention, wherein the organic flame retardant (C) is a phosphorus-containing flame retardant.

According to the fourth aspect of the present invention, there is provided the polypropylene resin composition of any one of the first to third aspects of the invention, wherein the fiber (B) is a glass fiber.

According to the fifth aspect of the present invention, there is provided a molded article produced by molding the polypropylene resin composition of any of the first to fourth aspects of the present invention.

Advantageous Effects of Invention

The polypropylene resin composition of the present invention containing a polypropylene resin, a polytetrafluoroethylene resin, an organic flame retardant and a fiber each in a specific, amount, and preferably further containing a polypropylene resin having a specific long-chain branched structure satisfies self-extinguishing property and drip resistance in firing in addition to excellent mechanical properties (rigidity, impact), weather resistance and moldability, and has extremely high-level flame retardance. Further, since the composition uses preferably a non-halogen flame retardant such as a phosphorus-containing flame retardant or the like as an organic flame retardant and does not use a chlorine, fluorine or bromine-containing compound, the environmental load thereof is extremely low.

DESCRIPTION OF EMBODIMENTS

The present invention relates to a polypropylene resin composition containing from 20 to 77 parts by weight of a polypropylene resin (A) containing a polypropylene resin (Y) (hereinafter this may be simply referred to as component (Y)) and satisfying a specific requirement (hereinafter this may be simply referred to as component (A)), from 5 to 40 parts by weight of a specific fiber (B) (hereinafter this may be simply referred to as component (B), from 18 to 40 parts by weight of an organic flame retardant (C) (hereinafter this may be simply referred to as component (C)) (provided that the total content of the component (A), the component (B) and the component (C) is 100 parts by weight), and containing a polytetrafluoroethylene resin (D) (hereinafter this may be simply referred to as component (D) in an amount of from 0.01 to 1.5 parts by weight relative to 100 parts by weight of the total amount of the polypropylene resin (A), the fiber (B) and the organic flame retardant (C), and further containing, as a preferred component of the component (A), a polypropylene resin (X) having a specific long-chain branched structure (hereinafter this may be simply referred to as component (X)), wherein the proportion of the resins is that the polypropylene resin (Y) is from 70 to 99% by weight and the polypropylene resin (X) having a long-chain branched structure is from 1 to 30% by weight (provided that the total of the polypropylene resin (Y) and the polypropylene resin (X) having a long-chain branched structure is 100% by weight), and relates to a molded article formed by molding the composition.

The polypropylene resin composition and the molded article formed by molding the composition of the present invention solve the problems with already-existing polypropylene resin compositions and molded articles formed by molding the composition, and can favorably use for various molded articles, especially to automobile parts, electric parts, container packaging parts, building components, large-size components and others, as having extremely high-level flame retardance in addition to the excellent mechanical properties, the weather resistance and the moldability due to containing the fibers.

Hereinafter the polypropylene resin composition and the molded article formed by molding the composition of the present invention are described in detail for each category.

I. Constituent Components of Polypropylene Resin Composition

1. Polypropylene Resin (A) (Component (A))

The polypropylene resin (A) for use in the present invention contains a specific polypropylene resin (Y) (requirement (A-1)), and satisfies the requirement (A-2) in relation to the polypropylene resin (X) having a specific long-chain branched structure. Preferably, the polypropylene resin (Y) contains the polypropylene resin (X) having a long-chain branched structure, and the proportion thereof is that the polypropylene resin (Y) is from 70 to 99% by weight and the polypropylene resin. (X) having a long-chain branched structure is from 1 to 30% by weight (provided that the total of the polypropylene resin (Y) and the polypropylene resin (X) having a long-chain branched structure is 100% by weight) (requirement (A-3)).

1). Polypropylene resin (Y)

The details of the polypropylene resin (Y) for use in the present invention are described below.

1)-1. Characteristic (Y-i): polypropylene resin (Y)

The polypropylene resin (Y) for use in the present invention is at least one polypropylene resin selected from a group consisting of a propylene homopolymer, a propylene-α-olefin block copolymer and a propylene-α-olefin random copolymer, not corresponding to the polypropylene resin (X) having a long-chain branched structure to be mentioned hereinunder. (Hereinafter in the present description, propylene-α-olefin block copolymer and propylene-α-olefin random copolymer may be simply referred to as "propylene-α-olefin copolymer".)

The propylene-α-olefin copolymer preferred for use herein is a copolymer of propylene and a comonomer of an α-olefin having from 2 to 8 carbon atoms except propylene, or a random or block copolymer of propylene and an α-olefin in which the propylene content is from 70 to 99% by weight (that is, the comonomer content is from 1 to 30% by weight), more preferably the propylene content is 90% by weight or more. A mixture of random copolymers or block copolymers that differ in the α-olefin therein is also usable.

As the comonomer to be copolymerized with propylene, one alone or two or more types of α-olefins each having from 2 to 8 carbon atoms except propylene may be used either singly or as combined.

The propylene-α-olefin copolymer concretely includes a binary copolymer such as a propylene-ethylene copolymer, propylene-butene-1 copolymer, a propylene-pentene-1 copolymer, a propylene-hexene-1 copolymer or a propylene-octene-1 copolymer, a ternary copolymer such as a propylene-ethylene-butene-1 copolymer or a propylene-ethylene-hexene-1 copolymer, etc. Preferred are a propylene-ethylene random copolymer, a propylene-ethylene-butene-1 random copolymer, etc. The content of the α-olefin monomer in the propylene-α-olefin copolymer is generally from 0.01 to 30% by weight or so, preferably from 1 to 30% by weight or so, more preferably from 1 to 10% by weight or so.

The α-olefin having from 2 to 8 carbon atoms except propylene includes, for example, ethylene, 1-butene, 2-methyl-1-propene, 1-pentene, 2-methyl-1-butene, 3-methyl-1-butene, 1-hexene, 2-ethyl-2-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, 1-octene, etc.

From the viewpoint of moldability, the melting point of the polypropylene resin (Y) is preferably from 100 to 170° C., more preferably from 160 to 165° C. The melting point of a polypropylene resin may be suitably controlled depending on the propylene, the type of the α-olefin except propylene to be used as source materials, the copolymerization ratio, MFR, etc. In this description "melting point" is a melting peak temperature measured through with a differential scanning calorimeter (DSC).

1)-2 Characteristic (Y-ii): Melt Flow Rate of Polypropylene Resin (Y)

The melt flow rate (hereinafter this may be expressed as MFR) according to JIS K7210 (2005) of the polypropylene resin CO for use in the present invention [measurement temperature 230° C., load 2.16 kg (21.18 N)] is preferably from 1.0 to 200 g/10 min, more preferably from 5.0 to 150 g/10 min even more preferably from 10 to 100 g/10 min. With MFR falling within the range, the polypropylene resin composition and its molded article of the present invention can keep good moldability, can express high-level drip resistance and can attain high-level flame retardance. Specifically, when MFR is lower than 1 g/10 min, the load in molding the polypropylene resin composition of the present invention increases so that the moldability thereof would worsen, and the appearance of the molded articles would worsen, for example, the molded articles would discolor; but on the contrary, when more than 200 g/10 min, the composition could not exhibit suitable drip resistance and the flame retardance thereof would worsen.

The isotactic pentad fraction (mmmm fraction) indicating the degree of crystallinity of the polypropylene resin (Y) is preferably 96% or more for use in the present invention, more preferably, the isotactic pentad fraction is 97% or more. When the isotactic pentad fraction is 96% or more, the rigidity and the heat resistance may increase, and the physical properties could be favorably better. This is presumed to be because, in the polypropylene resin (Y), the molecular orientation crystallinity could increase and in the polypropylene resin composition and its molded article of the present invention, orientation and uniform dispersion of the fiber (B) to be mentioned hereinunder could be thereby facilitated. The degree of crystallinity of the polypropylene resin (Y) may be controlled by controlling the molecular weight distribution thereof through selection of the copolymerization ratio of the starting materials, and the catalyst to be used.

The isotactic pentad fraction (mmmm) is a value to be measured in $^{13}$C-NMR (nuclear magnetic resonance), and is an isotactic fraction of the pentad units in the polypropylene molecular chain to be determined using a nuclear magnetic resonance spectrum ($^{13}$C-NMR) with isotopic carbon. Namely, the isotactic pentad fraction is a fraction of propylene units of continuously isotactic-bonded 5 propylene monomer units. Specifically, the isotactic pentad units are determined as the intensity fraction of the mmmm peak in all the absorption peaks in the methyl carbon region of the $^{13}$C-NMR spectrum, and, for example, an apparatus of JEOL's FT-NMR. 270 MHz may be used.

The catalyst to be used for preparing the polypropylene resin (Y) for use in the present invention is not specifically limited, and any known catalyst is usable. For example, a so-called Ziegler-Natta catalyst of a combination of a titanium compound and an organic aluminium compound (for example, described in Polypropylene Handbook (May 15, 1998, 1st ed., 1st run), etc.), or a metallocene catalyst (for example, described in JP-A 5-295022) may be used.

The polymerization process for preparing the polypropylene resin (Y) for use in the present invention is not specifically limited, and any known polymerization process may be used. For example, a slurry polymerization method, a bulk polymerization method, a gas-phase polymerization method and the like may be used. Any of a batch polymerization method or a continuous polymerization method may be used, and if desired, a two-stage, three-stage or more multistage continuous polymerization method may be used. By mechanically melt-kneading two or more propylene polymers, the resin may be produced.

As the polypropylene resin usable as the polypropylene resin (Y), various commercial products are put on the market by many companies. For example, there are mentioned Novatec Series products manufactured by Japan Polypropylene Corporation. Products having desired properties are selected from those commercial products and may be used herein.

2) Polypropylene Resin (X) Having Long-Chain Branched Structure (Component (X))

The polypropylene resin (X) having a long-chain branched structure for use in the present invention is characterized by having the following characteristics (X-i) to (X-iv).

Characteristic (X-i): The melt flow rate (MFR) (230° C., 2.16 kg load) is from 0.1 to 30.0 g/min.

Characteristic (X-ii): The molecular weight distribution Mw/Mn through GPC is from 3.0 to 10.0 and Mz/Mw is from 2.5 to 10.0.

Characteristic (X-iii): The melt tension (MT) (unit: g) satisfies any of the following:

$$\log(MT) \geq -0.9 \times \log(MFR) + 0.7 \text{ or } MT \cong 15$$

Characteristic (X-iv): The paraxylene-soluble fraction (CXS) at 25° C. is less than 5.0% by weight relative to the total amount of the polypropylene resin (X).

Hereinunder the above-mentioned characteristic requirements defined in the present invention, and a production method for the polypropylene resin (X) having a long-chain branched structure are described concretely.

2)-1. Characteristic (X-i): Melt Flow Rate (MFR)

The melt flow rate (MFR) of the polypropylene resin (X) having a long-chain branched structure for use in the present invention must fall within a range of from 0.1 to 30.0 g/10 min, and is preferably from 0.3 to 25.0 g/10 min, more preferably from 0.5 to 20.0 g/10 min. By defining MFR of the component (X) to fail within the range, the polypropylene resin composition of the present invention can exhibit good moldability while maintaining suitable flowability and, in addition, can have suitable melt tension, and therefore, the resin composition can have good drip resistance and can exhibit the effect of exhibiting high-level flame retardance. Specifically, the component (X) whose MFR is lower than the range is insufficient in flowability, and may cause some problems in production, fix example, in that extruders in various moldings may require a too high load. On the other hand, the component (X) whose MFR is higher than the range is insufficient in melt tension (viscosity) and therefore the drip resistance effect in firing would be poor, and the polypropylene resin composition would be unsuitable as a flame-retardant material.

MFR is measured according to Method A "Test Method for Melt Mass Flow Rate (MFR) and Melt Volume Flow Rate (MVR) of Plastics—Thermoplastic Plastics" under condition M (230° C., 2.16 kg load) in JIS K7210:1999. The unit is g/10 min.

2)-2. Characteristic (X-ii): Molecular Weight Distribution Through GPC

The polypropylene resin (X) having a long-chain branched structure must have a relatively broad molecular weight distribution, and the molecular weight distribution Mw/Mn thereof obtained by Gel Permeation Chromatography (GPC) (where Mw means a weight-average molecular weight and Mn means a number-average molecular weight) must be from 3.0 to 10.0. A preferred range of the molecular weight distribution Mw/Mn of the polypropylene resin (X) having a long-chain branched structure is from 3.5 to 8.0, more preferably from 4.1 to 6.0.

Further, as a parameter to more remarkably express the broadness of the molecular weight distribution, Mz/Mw (where Mz is a Z-average molecular weight) must be from 2.5 to 10.0. A preferred range of Mz/Mw is from 2.8 to 8.0, more preferably from 3.0 to 6.0.

Resins having a broader molecular weight distribution could have more improved moldability, but those whose Mw/Mn and Mz/Mw each fall with the range have especially excellent molecular weight.

Definitions of Mn, Mw and Mz are described in "Basis of Polymer Chemistry" (edited by the Society of Polymer Science, Japan, Tokyo Kagaku-Dojin Publishing Co., Ltd., 1978) or the like, and can be calculated from the molecular weight curve from GPC. A specific measurement method through GPC employed in Examples in the present description is as follows.

Apparatus: Waters' GPC (ALC/GPC 150C)

Detector: FOXBORO's MIRAN 1A IR Detector (measurement wavelength: 3.42 μm)

Column: Showa Denko's AD806M/S (×3)

Mobile phase solvent: orthodichlorobenzene (ODCB)

Measurement temperature: 140° C.

Flow rate: 1.0 ml/min

Injection amount: 0.2 ml

Preparation of sample: Using ODCB (containing 0.5 mg/mL, of BHT), a sample solution of 1 mg/mL is prepared, and dissolved at 140° C., taking about 1 hour.

For conversion from the retention volume obtained in GPC to the molecular weight, a standard polystyrene (PS) calibration curve previously prepared is used. Compounds of standard polystyrene to be used are Tosoh's brands mentioned below.

F380, F288, F128, F80, F40, F20, F10, F4, F1, A5000, A2500, A1000

0.2 mL of a solution prepared by dissolving each compound in ODCB (containing 0.5 rag/mL of BHT) so as to be 0.5 mg/mL is injected to prepare a calibration curve. The calibration curve uses a cubic expression method obtained through approximation according to a least-squares method.

The viscosity equation $[\eta] = K \times M^\alpha$ to be used in conversion into the molecular weight uses the following numerical values.

PS: $K=1.38 \times 10^{-4}$, $\alpha=0.7$

PP: $K=1.03 \times 10^{-4}$, $\alpha=0.78$

Using other apparatus, detector, column and others that are on the same level as above also makes it possible to determine the molecular weight distribution though GPC.

2)-3. Characteristic (X-iii): Melt Tension (MT)

Further, the polypropylene resin (X) having a long-chain branched structure must satisfy the following requirement (1).

Requirement (1)

$$\log(MT) \geq -0.9 \times \log(MFR) + 0.7$$

or $$MT \geq 15$$

In Examples in this description, MT is a melt tension measured using Toyo Seiki Seisakusho's Capillograph 1B, in which the capillary has a diameter of 2.0 mm and a length of 40 mm, the cylinder diameter is 9.55 mm, the cylinder extrusion rate is 20 mm/min, the take-up speed is 4.0 m/min and the temperature is 230° C., and the unit thereof is gram. Using other devices on the same level, MT can also be measured. However, in a case where MT of the component (X) is extremely high, the resin may cut at a take-up speed of 4.0 m/min, and in the case, therefore, the take-up speed is lowered and the tension at the highest speed for possible take-up is referred to as MT. The measurement condition and the unit for MFR are as mentioned above.

The definition is an index at which the polypropylene resin (X) having a long-chain branched structure could exhibit sufficient drip resistance in a firing test, and in general, MT has a correlation with MFR, and is therefore described as a relational equation with MFR.

As in the above, a method of defining MT by a relational formula with MFR is a known method for anyone skilled in the art, and liar example, JP-A 2003-25425 proposes the following relational expression as a definition of polypropylene having a high melt tension.

$$\log(MS) > -0.61 \times \log(MFR) + 0.82 \ (230° \text{ C.})$$

(Here, MS has the same meaning as MT.)

JP-A 2003-64193 proposes the following relational expression as a definition of polypropylene having a high melt tension.

$$11.32 \times MFR^{-0.7854} \leq MT \ (230° \text{ C.})$$

Further, JP-A 2003-94504 proposes the following relational expression as a definition of polypropylene having a high melt tension.

$$MT \geq 7.52 \times MFR^{-0.576}$$

(MT is a value measured at 190° C., and MFR is a value measured at 230° C.)

When the polypropylene resin (X) having a long-chain branched structure satisfies the above-mentioned requirement (1), the resin can be said to have a sufficiently high melt tension. Specifically, the polypropylene resin (X) having a long-chain branched structure and satisfying the requirement (1) is to be a resin excellent in drip resistance, and therefore when combined with a fiber (B) and an organic flame retardant (C) to be mentioned below, the resultant composition is especially useful as a flame-retardant material. More preferably, the resin satisfies the following requirement (1)', even more preferably the following requirement (1)".

Requirement (1)'

The resin satisfies any of $$\log(MT) \geq -0.9 \times \log(MFR) + 0.9$$

or $$MT \geq 15.$$

Requirement (1)"

The resin satisfies any of:

$$\log(MT) \geq -0.9 \times \log(MFR) + 1.1$$

or $$MT \geq 15.$$

It is unnecessary to specifically define the upper limit of MT, but when MT is more than 40 g, the take-up speed according to the above-mentioned measurement method would be extremely low and the measurement would be difficult. In such a case, it is considered that the ductility of the resin would worsen. Therefore, MT is preferably 40 g or less, more preferably 35 g or less, even more preferably 30 g or less.

2)-4. Characteristic (X-iv): Paraxylene-Soluble Fraction (CXS) at 25° C.

Preferably, the stereoregularity of the polypropylene resin (X) having a long-chain branched structure for use in the present invention is higher, since the low-crystalline component to be a cause of stickiness and bleeding-out of the polypropylene resin composition and its molded article of the present invention could be small and since the resin could have high rigidity. The low-crystalline component may be evaluated as a 25° C. xylene-soluble component (CXS), and the content thereof must be less than 5.0% by weight relative to the total component (X), more preferably 3.0% by weight or less, even more preferably 1.0% by weight or less, still more preferably 0.5% by weight or less. The lower limit is not specifically defined, but is generally 0.01% by weight or more, preferably 0.03% by weight or more. When CXS is defined to fall within the range, the rigidity of the polypropylene resin composition and its molded article of the present invention can be high, as described above, and in addition, stickiness and bleeding-out can be prevented.

The details of the measurement method for CXS are as follows.

2 g of a sample is dissolved in 300 ml of p-xylene (containing 0.5 mg/ml of BUT) at 130° C. to prepare a solution, and then left at 25° C. for 12 hours. Subsequently, the precipitated polymer is taken out through filtration, and p-xylene is evaporated away from the filtrate, and further the residue is dried under reduced pressure at 100° C. or 12 hours to recover a room-temperature xylene-soluble component. The ratio of the weight of the recovered component to the weight of the tested sample [% by weight] is defined as CXS.

As additional characteristics of the polypropylene resin (X) having a long-chain branched structure for use in the present invention, the resin preferably has the following characteristic (X-v), and more preferably has the following characteristic (X-vi).

The characteristic (X-iv) and the characteristics (X-v) and (X-vi) to be mentioned below are all characteristics relating to stereoregularity. Especially preferably, the resin satisfies all the requirements (X-v) and (X-vi) in addition to the characteristic (X-iv).

2)-5. Characteristic (X-v): mm Fraction of 3 Propylene Unit Chains in $^{13}$C-NMR The polypropylene resin (X) having a long-chain branched structure for use in the present invention preferably has high stereoregularity. The height of stereoregularity can be evaluated by $^{13}$C-NMR. Preferably, the resin has stereoregularity that the mm fraction of 3 propylene unit chains obtained in $^{13}$C-NMR thereof is 95.0% or more.

The mm fraction is a ratio of three propylene unit chains in which the direction of the methyl branches in each propylene unit is the same, in any arbitrary 3 propylene unit chains having a head-tail junction in a polymer chain, and the upper limit thereof is 100%. The mm fraction is a value indicating that the stereostructure of the methyl groups in a polypropylene molecular chain is in isotactic control. A higher value of the mm fraction indicates that the resin is under higher control. When the mm fraction is made to fall within the range to be mentioned below, the flexural modulus that is an index of the rigidity of the polypropylene resin composition and its molded article of the present invention can be made high. In other words, when the mm fraction is smaller than the value shown below, the mechanical properties of the polypropylene resin composition and its molded article of the present invention may worsen, specifically, the flexural modulus that is an index of the rigidity thereof may lower.

Accordingly, the mm fraction is preferably 95.0% or more, more preferably 96.0% or more, even more preferably 97.0% or more, and as described above, the upper limit thereof is 100%.

The details of the measurement method for the mm fraction of 3 propylene unit chains through $^{13}$C-NMR are as follows.

375 mg of a sample is completely dissolved in 2.5 ml of deuterated 1,1,2,2-tetrachloroethane in an NMR sample tube (10), and then analyzed according to a proton complete decoupling method at 125° C. Regarding the chemical shift, the center peak of three peaks of deuterated 1,1,2,2-tetrachloroethane is set at 74.2 ppm. The chemical shift of the other carbon peaks is based on it.

Flip angle: 90 degrees
Pulse interval: 10 sec
Resonance frequency: 100 MHz or more
Cumulative number: 10,000 times or more
Observation range: −20 ppm to 179 ppm
Data point number: 32768

Analysis of the mm fraction is based on the $^{13}$C-NMR spectrum measured under the above-mentioned condition.

Macromolecules, Vol. 8, p. 687 (1975) and Polymer, Vol. 30, p. 1350 (1989) are referred to for spectral assignment.

A more specific method for min fraction determination is described in detail in paragraphs [0053] to [0065] in JP-A 2009-275207, and in the present invention, the method is referred to.

2)-6. Characteristic (X-vi): Branching Index g'

As a direct index of branching of the polypropylene resin (X) having a long-chain branched structure, there is mentioned a branching index g'. g' is given by a ratio of the intrinsic viscosity [η]br of a polymer having a long-chain branched structure to the intrinsic viscosity [η]lin of a linear polymer having the same molecular weight as that of the branched polymer, that is, [η]br/[η]lin, and is smaller than 1 in the presence of a long-chain branched structure.

The definition is described in, for example, "Developments in Polymer Characterization-4" (J. V. Dawkins ed. Applied Science Publishers, 1983), and the index is a known one for anyone skilled in the art.

g' may be obtained as a function of an absolute molecular weight Mabs, for example, using GPC equipped with a light-scattering analyzer and a viscometer as mentioned below.

The polypropylene resin (X) having a long-chain branched structure for use in the present invention preferably has g; of from 0.30 to less than 1.00, when the absolute molecular weight Mabs thereof as measured through light scattering, Mabs is 1,000,000, more preferably from 0.55 to 0.98, even more preferably from 0.75 to 0.96, most preferably from 0.78 to 0.95.

As described in detail hereinunder, the polypropylene resin (X) having a long-chain branched structure for use in the present invention may form a comb-shaped chain as the molecular structure thereof, from the polymerization mechanism, and when g' is defined to fall within the range, the melt tension can be controlled to fall within a suitable range, and therefore the drip resistance that is one evaluation index of flame retardance can be increased and, in addition, good moldability can be expressed. Specifically, when g' is less than 0.30, the ratio of the main chain is small and the ratio of the side chains is extremely lame, and in such a case, the melt tension could not increase or gel may form and therefore the drip resistance lowers to have some negative influence on various mechanical strength properties, and, as a result, the resin of the type is unfavorable for a fame-retardant material having high flame retardance that is targeted by the present invention. On the other hand, when the value of 1.00 means that the resin is not branched, and the resin of the type would have a low melt tension to lower the drip resistance, and therefore the resin of the type is also unfavorable for a flame-retardant material having high flame retardance that is targeted by the present invention.

The lower limit of g' is preferably the value mentioned above, and the reason is as follows.

According to "Encyclopedia of Polymer Science and Engineering, Vol. 2" (John Wiley & Sons, 1985, p. 485), the g' value of a comb-shaped polymer is expressed by the following equation.

$$g' = g^{\varepsilon} = \left\{\lambda + \frac{3(1-\lambda)^2}{p} + \frac{(1-\lambda)^3}{p^2}\right\}^{\varepsilon} \quad \text{[Math. 1]}$$

In the above, g is a branching index defined by the rotation radius ratio of a polymer, ε is a constant determined by the shape of the branch chain and a solvent, and according to Table 3 on page 487 of the above literature, it is reported that the value is from about 0.7 to 1.0 or so in a comb-shaped chain in a good solvent. λ is a ratio of the main chain of a comb-shaped chain, and p is a mean branching number. According to the equation, a comb-shaped chain may have an extremely large branching number, that is, when p is an infinite limit, g'=gε=λε and is not a value lower than λε, generally having a lower limit.

On the other hand, an already-known random branch chain equation, which may occur in a case of electronic beam irradiation or peroxide denaturation, is given by the formula (19) on page 485 of the above literature. According to this, in a random branch chain, g' and g values may monotonously decreases with the increase in the branch points, not involving any specific lower limit value. In other words, in the present invention, the presence of the lower limit of the value g' means that the polypropylene resin (X) having a long-chain branched structure for use in the present invention has a structure similar to a comb-shaped chain, and according to this, the differentiation from the random branch chain to be formed through electronic beam irradiation or peroxide denaturation may be more definitely clarified.

A branched polymer having g' that falls within the above range and having a structure similar to a comb-shaped chain is preferred, since the reduction in the melt tension thereof in repeated kneading is low, and therefore the physical properties and the moldability of the polymer of the type degrade little in reuse for molding of a recycled material that may be formed in a process of industrially producing molded articles, for example, lumber remnants in trimming during sheet or film formation, or members such as runners or the like in injection molding.

A specific calculation method for g' in Examples in the present description is mentioned below.

As a GPC apparatus equipped with a differential refractometer (RI) and a viscometer, Waters' Alliance GPCV2000 is used. As a light-scattering detector, a multiangle laser light scattering detector (MALLS), Wyatt Technology's DAWN-E is used. The detector is connected in an order of MALLS, RI and Viscometer. The mobile phase solvent is 1,2,4-trichlorobenzene (with BASF's antioxidant, Irganox 1076 added in an amount of 0.5 mg/mL).

The flow rate is 1 mL/min, and two columns of Tosoh's GMHHR-H(S) HT are used. The temperature in the column, the sample injection pad and each detector is 140° C. The sample concentration is 1 mg/mL, and the injection amount (sample loop volume) is 0.2175 mL.

In determining the absolute molecular weight (Mabs) from MALLS, the mean-square radius of gyration (Rg) and the limiting viscosity ([η]) obtained from the viscometer, data-processing software ASTRA (version 4.73.04) attached to MALLS is used and the following publications are referred to.

REFERENCES

1. "Developments in Polymer Characterization-4" (J. V. Dawkins ed. Applied Science Publishers, 1983, Chapter 1.)
2. Polymer, 45, 6495-6505 (2004)
3. Macromolecules, 33, 2424-2436 (2000)
4. Macromolecules, 33, 6945-6952 (2000)

For various devices and columns, any others equivalent thereto may be used.

[Calculation of Branching Index (g')]

The branching index (g') is calculated as a ratio of the intrinsic viscosity ([η]br) of a sample measured with the above-mentioned viscometer, to the intrinsic viscosity ([η]lin) of a linear polymer measured separately, that is, ([η]br/[η]lin).

When a long-chain branched structure is introduced into a polymer molecule, the radius of inertia of the polymer becomes smaller as compared with that of the linear polymer molecule having the same molecular weight. When the radius of inertia becomes small, the limiting viscosity also becomes small, and therefore, with introduction of a long-chain branched structure into a polymer, the ratio of the intrinsic viscosity ([η]br) of the branched polymer to the intrinsic viscosity ([η]lin) of the linear polymer having the same molecular weight, that is, ([η]br/[η]lin) becomes smaller.

Accordingly, a case where the branching index (g'=[η]br/[η]lin) is smaller than 1 means that branching has been introduced into the polymer. Here, as the linear polymer having [η]lin, a commercial homopolypropylene (Japan Polypropylene Corporation's Novatec PP (registered trademark), Grade FY6) is used. The logarithm of [η]lin of a linear polymer is in a linear relationship to the logarithm of the molecular weight thereof, and this is known as a Mark-Houwink-Sakurada equation. Therefore, [η]lin can be obtained by suitable extrapolation on the low-molecular weight side or the high-molecular weight side.

In the present invention, it can be said that the polypropylene resin satisfying the characteristic (X-iii) of $\log(MT) \geq -0.9 \times \log(MFR) + 0.7$ and satisfying $g' < 1$ with Mabs of 1,000,000 has a long-chain branched structure.

2)-7. Production Method for Polypropylene Resin (X) Having Long-Chain Branched Structure So far as the polypropylene resin (X) having a long-chain branched structure satisfies the above-mentioned requirements (X-i) to (X-iv), the production method for the resin is not specifically limited. A preferred production method for the resin that satisfies all the high stereoregularity, the small low-crystalline component amount and the range of the relatively broad molecular weight distribution as mentioned above, and preferably satisfies the requirements of the range of the branching index g', the high melt tension and others is a method of employing a macromer copolymerization method using a combined metallocene catalyst. Examples of the method are illustrated, for example, in JP-A 2009-57542.

This method is for producing a polypropylene having a long-chain branched structure, using a combination of a catalyst component having a specific structure and having a macromer production capability, and a catalyst component having a specific structure and having a macromer copolymerization capability in the high-molecular weight. According to the method, it is possible to produce the polypropylene resin (X) having a long-chain branched structure and having the intended physical properties, using art industrially effective method of bulk polymerization or gas-phase polymerization, especially in single-stage polymerization under practicable pressure and temperature conditions using hydrogen as a molecular weight-regulating agent.

Heretofore, the branching efficiency must be increased by reducing the crystallinity by the use of a polypropylene component having a low stereoregularity, but according to the above-mentioned method, a polypropylene component having a sufficiently high stereoregularity can be introduced into side chains according to a simple method. Employing the production method is preferred for satisfying the requirements (X-iv) to (X-v) relating to the high stereoregularity and the small low-crystalline component amount that are preferred for the polypropylene resin (X) having a long-chain branched structure for use in the present invention.

According to the above-mentioned method, two types of catalysts greatly differing in polymerization characteristics are used, and therefore the molecular weight distribution can be broadened and the requirements (X-i) to (X-iii) are all satisfied that are necessary for the polypropylene resin (X) having a long-chain branched structure for use in the present invention, and the method is therefore preferred.

A preferred production method for the polypropylene resin (X) having a long-chain branched structure for use in the present invention is described in detail hereinunder.

As a preferred production method for the polypropylene resin (X) having a long-chain branched structure, there is mentioned a production method for a propylene polymer using the following catalyst components (A), (B) and (C) as the propylene polymerization catalyst.

(A): Two or more types of Periodic Table Group-4 transition metal compounds, in which at least one is selected from the component [A-1] of a compound represented by the following general formula (a1), and at least one is selected from the component [A-2] of a compound represented by the following general formula (a2).

Component [A-1]: Compound represented by general formula (a1)

Component [A-2]: Compound represented by general formula (a2)

(B): Ion-exchanging layer silicate
(C): Organic aluminium compound

The catalyst components (A), (B) and (C) are described in detail hereinunder.

(1) Catalyst Component (A)
(i) Component [A1]: Compound Represented by General Formula (a1)

[Chem. 1]

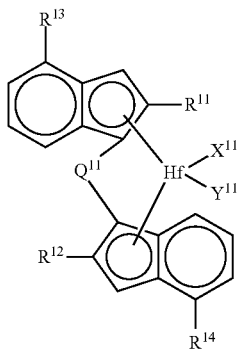

General Formula (a1)

(In the general formula (a1). $R^{11}$ and $R^{12}$ each independently represent a heterocyclic group having from 4 to 16 carbon atoms and containing nitrogen or oxygen and sulfur. $R^{13}$ and $R^{14}$ each independently represent an aryl group having from 6 to 16 carbon atoms and optionally containing halogen, silicon, oxygen, sulfur, nitrogen, boron, phosphorus or plural hetero elements selected from these, or a heterocyclic group having from 6 to 16 carbon atoms and containing nitrogen or oxygen and sulfur. $X^{11}$ and $Y^{11}$ each independently represent a hydrogen atom, a halogen atom, a hydrocarbon group having from 1 to 20 carbon atoms, a silicon-containing hydrocarbon group having from 1 to 20 carbon atoms, a halogenohydrocarbon group having from 1 to 20 carbon atoms, an oxygen-containing hydrocarbon group having from 1 to 20 carbon atoms, an amino group, or a nitrogen-containing hydrocarbon group having from 1 to 20 carbon atoms. $Q^{11}$ represents a divalent hydrocarbon group having from 1 to 20 carbon atoms, or a silylene group or germylene group optionally having a hydrocarbon group with from 1 to 20 carbon atoms.)

The heterocyclic group having from 4 to 16 carbon atoms and containing nitrogen or oxygen and sulfur for $R^{11}$ and $R^{12}$ is preferably a 2-furyl group, a substituted 2-furyl group, a substituted 2-thienyl group or a substituted 2-furfuryl group, and is more preferably a substituted 2-furyl group.

The substituent for the substituted 2-furyl group, the substituted 2-thienyl group and the substituted 2-furfuryl group includes an alkyl group having from 1 to 6 carbon atoms such as a methyl group, an ethyl group, a propyl group, etc.; a halogen atom such as a fluorine atom, a chlorine atom, etc.; an alkoxy group having from 1 to 6 carbon atoms such as a methoxy group, an ethoxy group, etc.; a trialkylsilyl group. Of those, a methyl group and a trimethylsilyl group are preferred, and a methyl group is more preferred.

$R^{11}$ and $R^{12}$ each are especially preferably a 2-(5-methyl)-furyl group. Also preferably, $R^{11}$ and $R^{12}$ are the same.

The aryl group having from 6 to 16 carbon atoms and optionally containing halogen, silicon, oxygen, sulfur, nitrogen, boron, phosphorus or plural hetero elements selected from these for $R^{13}$ and $R^{14}$ may have one or more substituents of a hydrocarbon group having from 1 to 6 carbon atoms, a silicon-containing hydrocarbon group having from 1 to 6 carbon atoms and a halogen-containing hydrocarbon group having from 1 to 6 carbon atoms, on the aryl cyclic skeleton within a range having from 6 to 16 carbon atoms.

Preferably, at least one of $R^{13}$ and $R^{14}$ is a phenyl group, a 4-methylphenyl group, a 4-i-propylphenyl group a 4-t-butylphenyl group, a 4-trimethylsilylphenyl group, a 2,3-dimethylphenyl group, a 3,5-di-t-butylphenyl group, a 4-phenylphenyl group, a chlorophenyl group, a naphthyl group, or a phenanthyl group, more preferably a phenyl group, a 4-i-propylphenyl group, a 4-t-butylphenyl group, a 4-trimethylsilylphenyl group, or a 4-chlorophenyl group. Preferably, $R^{13}$ and $R^{14}$ are the same.

In the general formula (a1), $X^{11}$ and $Y^{11}$ are auxiliary ligands, and react with a promoter of the catalyst component (B) to form an active metallocene having olefin polymerization capability. Accordingly, so far as the object can be attained, $X^{11}$ and $Y^{11}$ are not specifically limited in point of the type of the ligand, and each independently represent a hydrogen atom, a halogen atom, a hydrocarbon group having from 1 to 20 carbon atoms, a silicon-containing hydrocarbon group having from 1 to 20 carbon atoms, a halogenohydrocarbon group having from 1 to 20 carbon atoms, an oxygen-containing hydrocarbon group having from 1 to 20 carbon atoms, an amino group or a nitrogen-containing hydrocarbon group having from 1 to 20 carbon atoms, an alkoxy group having from 1 to 20 carbon atoms, an alkylamide group having from 1 to 20 carbon atoms, a trifluoromethanesulfonic acid group, or a phosphorus-containing hydrocarbon group having from 1 to 20 carbon atoms.

In the general formula (a1), $Q^{11}$ represents any of a divalent hydrocarbon group having from 1 to 20 carbon atoms, or a silylene group or germylene group optionally having a hydrocarbon group with from 1 to 20 carbon atoms, which bonds the two 5-membered rings. In a case where two hydrocarbon groups exist on the silylene group or the germylene group, they may bond to each other to form a cyclic structure.

Specific examples of $Q^{11}$ include an alkylene group such as methylene, methylmethylene, dimethylmethylene, 1,2-ethylene, etc.; an arylalkylene group such as diphenylmethylene, etc.; a silylene group; an alkylsilylene group such as methylsilylene, dimethylsilylene, diethylsilylene, di(n-propyl)silylene, di(i-propyl)silylene, di(cyclohexyl)silylene, etc.; an (alkyl)(aryl)silylene group such as methyl(phenyl)silylene, etc.; an arylsilylene group such as diphenylsilylene, etc.; an alkyloligosilylene group such as tetramethyldisilylene, etc.; a germylene group; an alkylgermylene group corresponding to the divalent silylene group having a hydrocarbon group with from 1 to 20 carbon atoms, in which silicon is replaced by germanium; an (alkyl)(aryl)germylene group; an arylgermylene group, etc. Of those, a silylene group having a hydrocarbon group with from 1 to 20 carbon atoms, or a germylene group having a hydrocarbon group with from 1 to 20 carbon atoms is preferred, and an alkylsilylene group or an alkylgermylene group is more preferred.

Preferred compounds of the compounds represented by the general formula (a1) are specifically exemplified hereinunder.

Dichloro[1,1'-dimethylsilylenebis{2-(2-furyl)-4-phenyl-indenyl}]hafnium, dichloro[1,1'-dimethylsilylenebis{2-(2-thienyl)-4-phenyl-indenyl}]hafnium, dichloro[1,1'-dimethylsilylenebis{2-(5-methyl-2-furyl)-4-phenyl-indenyl}]hafnium, dichloro[1,1'-diphenylsilylenebis{2-(5-methyl-2-furyl)-4-phenyl-indenyl}]hafnium, dichloro[1,1'- dimethylgermylenebis{2-(5-methyl-2-furyl)-4-phenyl-indenyl}]hafnium, dichloro[1,1'-dimethylgermylenebis{2-(5-methyl-2-thienyl)-4-phenyl-indenyl}]hafnium, dichloro[1,1'-dimethylsilylenebis{2-(5-t-butyl-2-furyl)-4-phenyl-indenyl}]hafnium, dichloro[1,1'-dimethylsilylenebis{2-(5-trimethylsilyl-2-furyl)-4-phenyl-indenyl}]hafnium, dichloro[1,1'-dimethylsilylenebis{2-(5-phenyl-2-furyl)-4-phenyl-indenyl}]hafnium, dichloro[1,1'-dimethylsilylenebis{2-(4,5-dimethyl-2-furyl)-4-phenyl-indenyl}]hafnium, dichloro[1,1'-dimethylsilylenebis{2-(2-benzofuryl)-4-phenyl-indenyl}]hafnium, dichloro[1,1'-dimethylsilylenebis{2-(5-methyl-2-furyl)-4-(4-methylphenyl)-indenyl}]hafnium, dichloro[1,1'-dimethylsilylenebis{2-(5-methyl-2-furyl)-4-(4-i-propylphenyl)-indenyl}]hafnium, dichloro[1,1'-dimethylsilylenebis{2-(5-methyl-2-furyl)-4-(4-trimethylsilylphenyl)-indenyl}]hafnium, dichloro[1,1'-dimethylsilylenebis{2-(2-furyl)-4-phenyl-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-(4-fluorophenyl)-indenyl}]hafnium, dichloro[1,1'-dimethylsilylenebis{2-(5-methyl-2-furyl)-4-(4-trifluoromethylphenyl)-indenyl}]hafnium, dichloro[1,1'-dimethylsilylenebis{2-(5-methyl-2-furyl)-4-(4-t-butylphenyl)-indenyl}]hafnium, dichloro[1,1'-dimethylsilylenebis{2-(2-furyl)-4-(1-naphthyl)-indenyl}]hafnium, dichloro[1,1'-dimethylsilylenebis{2-(2-furyl)-4-(2-naphthryl)-indenyl}]hafnium, dichloro[1,1'-dimethylsilylenebis{2-(2-furyl)-4-(2-phenanthryl)-indenyl}]hafnium, dichloro[1,1'-dimethylsilylenebis{2-(2-furyl)-4-(9-phenanthryl)-indenyl}]hafnium, dichloro[1,1'-dimethylsilylenebis{2-(5-methyl-2-furyl)-4-(1-naphthyl)-indenyl}]hafnium, dichloro[1,1'-dimethylsilylenebis{2-(5-methyl-2-furyl)-4-(2-naphthyl)-indenyl}]hafnium, dichloro[1,1'-dimethylsilylenebis{2-(5-methyl-2-furyl)-4-(2-phenanthryl)-indenyl}]hafnium, dichloro[1,1'-dimethylsilylenebis{2-(5-methyl-2-furyl)-4-(9-phenanthryl)-indenyl}]hafnium, dichloro[1,1'-dimethylsilylenebis{2-(5-t-butyl-2-furyl)-4-(1-naphthyl)-indenyl}]hafnium, dichloro[1,1'-dimethylsilylenebis{2-(5-t-butyl-2-furyl)-4-(2-naphthyl)-indenyl}]hafnium, dichloro[1,1'-dimethylsilylenebis{2-(5-t-butyl-2-furyl)-4-(2-phenanthryl)-indenyl}]hafnium, dichloro[1,1'-dimethylsilylenebis{2-(5-t-butyl-2-furyl)-4-(9-phenanthryl)-indenyl}]hafnium, etc.

Of those, more preferred are dichloro[1,1'-dimethylsilylenebis{2-(5-methyl-2-furyl)-4-phenyl-indenyl}]hafnium, dichloro[1,1'-dimethylsilylenebis{2-(5-methyl-2-furyl)-4-(4-methylphenyl)-indenyl}]hafnium, dichloro[1,1'-dimethylsilylenebis{2-(5-methyl-2-furyl)-4-(4-i-propylphenyl)-indenyl}]hafnium, dichloro[1,1'-dimethylsilylenebis{2-(5-methyl-2-furyl)-4-(4-trimethylsilylphenyl)-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-(2-naphthyl)-indenyl}]hafnium, dichloro[1,1'-dimethylsilylenebis{2-(5-methyl-2-furyl)-4-(4-t-butylphenyl)-indenyl}]hafnium.

Especially preferred are dichloro[1,1'-dimethylsilylenebis{2-(5-methyl-2-furyl)-4-phenyl-indenyl}]hafnium, dichloro[1,1'-dimethylsilylenebis{2-(5-methyl-2-furyl)-4-(4-i-propylphenyl)-indenyl}]hafnium, dichloro[1,1'-dimethylsilylenebis{2-(5-methyl-2-furyl)-4-(4-trimethylsilylphenyl)-indenyl}]hafnium, dichloro[1,1'-dimethylsilylenebis{2-(5-methyl-2-furyl)-4-(4-t-butylphenyl)-indenyl}]hafnium.

(ii) Component 1A-21: Compounds Represented by General Formula (a2)

[Chem. 2]

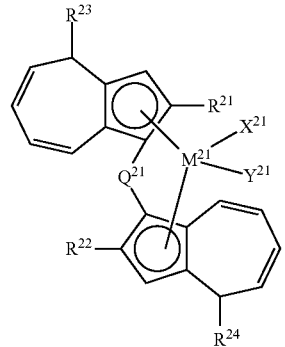

General Formula (a2)

(In the general formula (a2), $R^{21}$ and $R^{22}$ each independently represent a hydrocarbon group having from 1 to 6 carbon atoms, and $R^{23}$ and $R^{24}$ each independently represent an aryl group having from 6 to 16 carbon atoms and optionally containing halogen, silicon, oxygen, sulfur, nitrogen, boron, phosphorus or plural hetero elements selected from these. $X^{21}$ and $Y^{21}$ each independently represent a hydrogen atom, a halogen atom a hydrocarbon group having from 1 to 20 carbon atoms, a silicon-containing hydrocarbon group having from 1 to 20 carbon atoms, a halogenohydrocarbon group having from 1 to 20 carbon atoms, an oxygen-containing hydrocarbon group having from 1 to 20 carbon atoms, an amino group, or a nitrogen-containing hydrocarbon group having from 1 to 20 carbon atoms represents a divalent hydrocarbon group having from 1 to 20 carbon atoms, or a silylene group or germylene group optionally having a hydrocarbon group with from 1 to 20 carbon atoms. $M^{21}$ represents zirconium or hafnium.)

$R^{21}$ and $R^{22}$ each independently represent a hydrocarbon group having from 1 to 6 carbon atoms, preferably an alkyl group, more preferably an alkyl group having from 1 to 4 carbon atoms. Specific examples of the group include methyl, ethyl, n-propyl, i-propyl, n-butyl, i-butyl, sec-butyl, n-pentyl, i-pentyl, n-hexyl, etc. Methyl, ethyl and n-propyl are preferred.

$R^{23}$ and $R^{24}$ each independently represent an aryl group having from 6 to 16, preferably from 6 to 12 carbon atoms and optionally containing halogen, silicon, or plural hetero elements selected from these. Preferred examples of the group include phenyl, 3-chlorophenyl, 4-chlorophenyl, 3-fluorophenyl, 4-fluorophenyl, 4-methylphenyl, 4-i-propylphenyl, 4-t-butylphenyl, 4-trimethylsilylphenyl, 4-(2-fluoro-4-biphenylyl), 4-(2-chloro-4-biphenylyl), 1-naphthyl, 2-naphthyl, 4-chloro-2-naphthyl, 3-methyl-4-trimethylsilylphenyl, 3,5-dimethyl-4-t-butylphenyl, 3,5-dimethyl-4-trimethylsilylphenyl, 3,5-dimethyl-4-t-butylphenyl, 3,5-dimethyl-4-trimethylsilylphenyl, 3,5-dichloro-4-trimethylsilylphenyl, etc.

$X^{21}$ and $Y^{21}$ are auxiliary ligands, and react with a promoter of the catalyst component (B) to form an active metallocene having olefin polymerization capability. Accordingly, so tar as the object can be attained, $X^{21}$ and $Y^{21}$ are not specifically limited in point of the type of the ligand, and each independently represent a hydrogen atom, a halogen atom, a hydrocarbon group having from 1 to 20 carbon atoms, a silicon-containing hydrocarbon group having from 1 to 20 carbon atoms, a halogenohydrocarbon group having from 1 to 20 carbon atoms, an oxygen-containing hydrocarbon group having from 1 to 20 carbon atoms, an amino group or a nitrogen-containing hydrocarbon group having from 1 to 20 carbon atoms, an alkoxy group having from 1 to 20 carbon atoms, an alkylamide group having from 1 to 20 carbon atoms, a trifluoromethanesulfonic acid group, or a phosphorus-containing hydrocarbon group having from 1 to 20 carbon atoms.

$Q^{21}$ is a bonding group that crosslinks the two conjugated 5-membered ring ligands, representing a divalent hydrocarbon group having from 1 to 20 carbon atoms, a silylene group optionally having a hydrocarbon group with from 1 to 20 carbon atoms, or a germylene group optionally having a hydrocarbon group with from 1 to 20 carbon atoms, preferably a substituted silylene group or a substituted germylene group.

The substituent bonding to silicon or germanium is preferably a hydrocarbon group having from 1 to 12 carbon atoms, and the two substituents may bond to each other. Specific examples of the group include methylene, dimethylmethylene, ethylene-1,2-diyl, dimethylsilylene, diethylsilylene, diphenylsilylene, methylphenylsilylene, 9-silafluorene-9,9-diyl, dimethylsilylene, diethylsilylene, diphenylsilylene, dimethylgermilene, diethylgermylene, diphenylgermylene, methylphenylgermylene, etc.

Further, $M^{21}$ is zirconium or hafnium, preferably hafnium.

Non-limitative examples of the metallocene compounds represented by the general formula (a2) include the following.

However, only typical exemplary compounds are described below, evading complicated many exemplifications. The present invention should not be interpreted as limited to these compounds, but it is obvious that various ligands, crosslinking groups and auxiliary ligands can be used in any arbitrary manner. Compounds having hafnium as the center metal are shown below, but compounds having zirconium as the center metal should be handled as those illustrated in this description.

Dichloro{1,1'-dimethylsilylenebis(2-methyl-4-phenyl-4-hydroazulenyl)}hafnium, dichloro[1,1'-dimethylsilylenebis{2-methyl-4-(4-chlorophenyl)-4-hydroazulenyl}]hafnium, dichloro[1,1'-dimethylsilylenebis{2-methyl-4-(4-t-butylphenyl)-4-hydroazulenyl}]hafnium, dichloro[1,1'-dimethylsilylenebis{2-methyl-4-(4-trimethylsilylphenyl)-4-hydroazulenyl}]hafnium, dichloro[1,1'-dimethylsilylenebis{2-methyl-4-(3-chloro-4-t-butylphenyl)-4-hydroazulenyl}]hafnium, dichloro[1,1'-dimethylsilylenebis{2-methyl-4-(3-methyl-4-t-butylphenyl)-4-hydroazulenyl}]hafnium, dichloro[1,1'-dimethylsilylenebis{2-methyl-4-(3-chloro-4-trimethylsilylphenyl)-4-hydroazulenyl}]hafnium, dichloro[1,1'-dimethylsilylenebis{2-methyl-4-(3-methyl-4-trimethylsilylphenyl)-4-hydroazulenyl}]hafnium, dichloro[1,1'-dimethylsilylenebis{2-methyl-4-(1-naphthyl)-4-hydroazulenyl}]hafnium, dichloro[1,1'-dimethylsilylenebis{2-methyl-4-(2-naphthyl)-4-hydroazulenyl}]hafnium, dichloro[1,1'-dimethylsilylenebis{2-methyl-4-(4-chloro-2-naphthyl)-4-hydroazulenyl}]hafnium, dichloro[1,1'-dimethylsilylenebis{2-methyl-4-(2-fluoro-4-biphenylyl)-4-hydroazulenyl}]hafnium, dichloro[1,1'-dimethylsilylenebis{2-methyl-4-(2-chloro-4-biphenylyl)-4-hydroazulenyl}]hafnium, dichloro[1,1'-dimethylsilylenebis{2-methyl-4-(9-phenanthryl)-4-hydroazulenyl}]hafnium, dichloro[1,1'-dimethylsilylenebis{2-ethyl-4-(4-chlorophenyl)-4-hydroazulenyl}]hafnium, dichloro[1,1'-dimethylsilylenebis{2-n-propyl-4-(3-chloro-4-trimethylsilylphenyl)-4-hydroazulenyl}]hafnium, dichloro[1,1'-dimethylsilylenebis{2-ethyl-4-(3-chloro-4-t-butylphenyl)-4-hydroazulenyl}]hafnium, dichloro[1,1'-dimethylsilylenebis{2-ethyl-4-(3-methyl-4-trimethylsilylphenyl)-4-hydroazulenyl}]hafnium, dichloro[1,1'-dimethylgermylenebis{2-methyl-4-(2-fluoro-4-biphenylyl)-4-hydroazulenyl}]hafnium, dichloro[1,1'-dimethylgermylenebis{2-methyl-4-(4-butylphenyl)-4-hydroazulenyl}]hafnium, dichloro[1,1'-(9-silafluorene-9,9-diyl)bis{2-ethyl-4-(4-chlorophenyl)-4-hydroazulenyl}]hafnium, dichloro[1,1'-dimethylsilylenebis{2-ethyl-4-(4-chloro-2-naphthyl)-4-hydroazulenyl}]hafnium, dichloro[1,1'-dimethylsilylenebis{2-ethyl-4-(2-fluoro-4-biphenylyl)-4-hydroazulenyl}]hafnium, dichloro[1,1'-(9-silafluorene-9,9-diyl)bis{2-ethyl-4-(3,5-dichloro-4-trimethylsilylphenyl)-4-hydroazulenyl}]hafnium, etc.

Of those, preferred are dichloro[1,1'-dimethylsilylenebis{2-methyl-4-(4-chlorophenyl)-4-hydroazulenyl}]hafnium, dichloro[1,1'-dimethylsilylenebis{2-methyl-4-(3-chloro-4-trimethylsilylphenyl)-4-hydroazulenyl}]hafnium, dichloro[1,1'-dimethylsilylenebis{2-ethyl-4-(2-fluoro-4-biphenylyl)-4-hydroazulenyl}]hafnium, dichloro[1,1'-dimethylsilylenebis{2-ethyl-4-(4-chloro-2-naphthyl)-4-hydroazulenyl}]hafnium, dichloro[1,1'-dimethylsilylenebis{2-ethyl-4-(3-methyl-4-trimethylsilylphenyl)-4-hydroazulenyl}]hafnium, dichloro[1,1'-(9-silafluorene-9,9-diyl)bis{2-ethyl-4-(3,5-dichloro-4-trimethylsilylphenyl)-4-hydroazulenyl}]hafnium.

More preferred are dichloro[1,1'-dimethylsilylenebis{2-methyl-4-(4-chlorophenyl)-4-hydroazulenyl}]hafnium, dichloro[1,1'-dimethylsilylenebis{2-ethyl-4-(2-fluoro-4-biphenylyl)-4-hydroazulenyl}]hafnium, dichloro[1,1'-dimethylsilylenebis{2-ethyl-4-(3-methyl-4-trimethylsilylphenyl)-4-hydroazulenyl}]hafnium, dichloro[1,1'-(9-silafluorene-9,9-diyl)bis{2-ethyl-4-(3,5-dichloro-4-trimethylsilylphenyl)-4-hydroazulenyl}]hafnium.

(2) Catalyst Component (B)

The catalyst component (B) preferably used in producing the polypropylene resin (X) is an ion-exchanging layer silicate.

(i) Types of Ion-Exchanging Layer Silicate

The ion-exchanging layer silicate (hereinafter this may be simply abbreviated as silicate) is a silicate compound having a crystal structure with planes each constituted by ionic bonding and piled up in parallel to each other by bonding force, in which the ions are exchangeable. Naturally, most silicates are produced as a main ingredient of clay minerals, and therefore often contain any other impurities (quartz, cristobalite, etc.) than ion-exchanging layer silicates, and the silicate for use herein may contain such impurities. Depending on the type, the amount, the particle size, the crystallinity and the dispersion condition of such impurities, silicates containing impurities would be better than pure silicates, and such composite forms are within the scope of the catalyst component (B).

The silicate for use in the present invention is not limited to natural products but may be any artificial synthetic product and may contain such synthetic products.

Specific examples of the silicate include, for example, the following layer silicates as described in "Clay Mineralogy" written by Haruo Shiromizu, Asakura Publishing (1995).

Smectite group such as montmorillonite sauconite, beidellite, nontronite, saponite, hectorite, stevensite, etc.; vermiculite group such as vermiculite, etc.; mica group such as mica, illite, sericite, glauconite, etc.; attapulgite, sepiolite, palygorskite, bentonite, pyrophyllite, talc, chlorite, etc.

The silicate is preferably one in which the main ingredient has a 2/1 structure, more preferably a smectite group, even more preferably montmorillonite. The type of the interlayer cation is not specifically limited, but from the viewpoint of availability with ease and at low cost as an industrial material, a silicate in which the main ingredient of the interlayer cation is an alkali metal or an alkaline earth metal is preferred.

(ii) Chemical Treatment of Ion-Exchanging Layer Silicate

The ion-exchanging layer silicate of the catalyst component (B) in the present invention may be used directly as it is, not requiring any specific treatment, but preferably undergoes chemical treatment. Here, for chemical treatment of the ion-exchanging layer silicate, any of surface treatment of removing impurities from the surface or treatment having some influence on the clay structure is employable. Concretely, there are mentioned acid treatment, alkali treatment, salt treatment, organic matter treatment, etc.

<Acid Treatment>:

In acid treatment, impurities may be removed from surface, and in addition, a part or all of cations such as Al, Fe, Mg and the like in the crystal structure may be released.

The acid for use in acid treatment is preferably selected from hydrochloric acid, sulfuric acid, nitric acid, phosphoric acid, acetic acid and oxalic acid.

Two or more types of salts (to be described in the next section) and acids may be used. The treatment condition with salt and acid is not specifically limited, but in general, it is desirable that the salt or acid concentration is from 0.1 to 50% by weight, the treatment temperature is from room temperature to boiling point, and the processing time is from 5 minutes to 24 hours. Under the condition, at least a part of the substances that constitute at least one compound selected from a group consisting of ion-exchanging layer silicates are released. In general, salts and acids are used in the form of an aqueous solution thereof.

One prepared by combining the following acids and salts may be used as a treating agent. A combination of these acids and salts is also employable.

<Salt Treatment>

40% or more, preferably 60% or more of exchangeable Group-1 metal cations that the ion-exchanging layer silicate may contain before treatment with salt are preferably ion-exchanged with cations dissociated from the following salts.

The salt to be used in salt treatment for ion exchange is a compound formed of a cation containing at least one atom selected from a group consisting of Group-1 to Group-14 atoms, and at least one anion selected from a group consisting of a halogen atom, an inorganic acid and an organic acid, more preferably a compound formed of a cation containing at least one atom selected from a group consisting of Group-2 to Group 14 atoms, and at least one anion selected from a group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, $OOCCH_2CH_3$, $C_2H_4O_4$ and $C_5H_5O_7$.

As specific examples of such salts, there are mentioned LiF, LiCl, LiBr, LiI, $Li_2SO_4$, $Li(CH_3COO)$, $LiCO_3$, $Li(C_6H_5O_7)$, $LiCHO_2$, $LiC_2O_4$, $LiClO_4$, $Li_3PO_4$, $CaCl_2$, $CaSO_4$, $CaC_2O_4$, $Ca(NO_3)_2$, $Ca_3(C_6H_5O_7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, $MgC_4H_4O_4$, etc.

Also there are mentioned $Ti(OOCCH_3)_4$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, $ZrO(ClO_4)_2$, $ZrO(SO_4)$, $HF(OOCCH_3)_4$, $HF(CO_3)_2$, $HF(NO_3)_4$, $HF(SO_4)_2$, $HFOCl_2$, $HFF_4$, $HFCl_4$, $V(CH_3COCHCOCH_3)_3$, $VOSO_4$, $VOCl_3$, $VCl_3$, $VCl_4$, $VBr_3$, etc.

Also there are mentioned $Cr(CH_3COCHCOCH_3)_3$, $Cr(OOCCH_3)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $Mn(OOCCH_3)_2$, $Mn(CH_3COCHCOCH_3)_2$, $MnCO_3$, $Mn(NO_3)_2$, MnO, $Mn(ClO_4)_2$, $MnF_2$, $MnCl_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeCl_3$, $FeC_6H_5O_7$, etc.

Also there are mentioned $Co(OOCCH_3)_2$, $Co(CH_3COCHCOCH_3)_3$, $CoCO_3$, $Co(NO_3)_2$, $CoC_2H_4$, $Co(ClO_4)_2$, $CO_3(PO_4)_2$, $CoSO_4$, $CoF_2$, $CoCl_2$, $NiCO_3$, $Ni(NO_3)_2$, $NiC_2O_4$, $Ni(ClO_4)_2$, $NiSO_4$, $NiCl_2$, $NiBr_2$, etc.

Further there are mentioned $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $GeBr_4$, $GeI_4$, etc.

<Alkali Treatment>

In addition to acid treatment and salt treatment, if desired, the following alkali treatment or organic matter treatment may be carried out. Examples of the treating agent to be used in alkali treatment include LiOH, NaOH, KOH, $Mg(OH)_2$, $Ca(OH)_2$, $Sr(OH)_2$, $Ba(OH)_2$, etc.

<Organic Matter Treatment>

Examples of the organic treatment agent for use in organic matter treatment include trimethylammonium, triethylammonium, N,N-dimethylanilinium, triphenylphosphonium, etc.

Examples of the anion constituting the organic treatment agent include hexafluorophosphate, tetrafluoroborate, tetraphenylborate, etc., in addition to the anions exemplified hereinabove for those constituting salt treatment agents. However, these are not limitative.

One alone or two or more types of these treatment agents may be used either singly or as combined. Regarding the combination, the treatment agents to be added at the start of treatment may be combined, or those to be added during treatment may be combined. Chemical treatment may be carried out plural times, using one and the same treatment or using different treatment agents.

The ion-exchanging layer silicate generally contains adsorbed water and interlayer water. In the present invention, preferably, such adsorbed water and interlayer water are removed from the catalyst component (B) before use.

The heat treatment method for removing adsorbed water and interlayer water from the ion-exchanging layer silicate is not specifically limited, but must be so selected that interlayer water may not remain and that the treatment does not cause structural disorder. The heating time is 0.5 hours or more, preferably 1 hour or more. In the case, it is desirable that the water content of the dewatered catalyst component (B) is 3% by weight or less, preferably 1% by weight or less, when the water content of the component dewatered at a temperature of 200° C. and under a pressure of 1 mmHg for 2 hours is 0% by weight.

As described above, in the present invention, ion-exchanging layer silicates prepared through salt treatment and/or acid treatment and having a water content of 3% by weight or less are especially preferred as the catalyst component (B).

Before use for catalyst formation or as catalyst, the ion-exchanging layer silicate may be treated with a catalyst component (C) of an organic aluminium compound to be mentioned hereinunder, and the thus-treated silicate is preferred. The amount of the catalyst component (C) relative to 1 g of the ion-exchanging layer silicate is not limited, but in general, the amount is 20 mmol or less, and is preferably from 0.5 mmol to 1.0 mmol. The treatment temperature and the treatment time are not limited, and the treatment temperature is generally 0° C. or higher and 70° C. or lower, and the treatment time may be 10 minutes or more and 3 hours or less. After the treatment, the silicate may be washed, and washing it is preferred. As the solvent, a hydrocarbon solvent that is the same as the solvent to be used in prepolymerization or slurry polymerization to be mentioned hereinunder, is used.

Preferably, the catalyst component (B) is in the form of spherical particles having a mean particle size of 5 μm or more. As the particles, natural substances or commercial products may be used directly as they are so far as they are spherical, or those whose form and particle size have been controlled through granulation, size classification or fractionation may also be used.

The granulation method employable here includes, for example, a stirring granulation method, and a spraying granulation method. Commercial products may also be used.

During granulation, an organic matter, an inorganic solvent, an inorganic salt and various binders may be used.

The spherical particles obtained in the manner as above preferably have a compression break strength of 0.2 MPa or more, more preferably 0.5 MPa or more, in order to prevent breakage or fine powder formation during a process of polymerization. When the particles have such a particle strength, the particle performance improving effect can be effectively exhibited especially in prepolymerization.

(3) Catalyst Component (C)

The catalyst component (C) is an organic aluminium compound. The organic aluminium compound to be used as the catalyst component (C) is preferably a compound represented by a general formula, $(AlR^{31}_q Z_{3-q})_p$.

Needless-to-say in the present invention, one alone or plural types of the compounds represented by the formula may be used either singly or as combined. In the formula, $R^{31}$ represents a hydrocarbon group having from 1 to 20 carbon atoms, Z represents a halogen, hydrogen, an alkoxy group or an amino group q indicates an integer of from 1 to 3, and p indicates an integer of 1 or 2. $R^{33}$ is preferably an alkyl group. When Z is a halogen, it is preferably chlorine; when Z is an alkoxy group, it is preferably an alkoxy group having from 1 to 8 carbon atoms; and when Z is an amino group, it is preferably an amino group having from 1 to 8 carbon atoms.

Specific examples of the organic aluminium compound include trimethylaluminium, triethylaluminium, tri-normal-propylaluminium, tri-normal-butylaluminium, tri-isobutyl-aluminium, tri-normal-hexylaluminium, tri-normal-octyl-aluminium, tri-normal-decylaluminium, diethylaluminium chloride, diethylaluminium sesquichloride, diethylaluminium hydride, diethylaluminium ethoxide, diethylaluminium dimethylamide, diisobutylaluminium hydride, diisobutylaluminium chloride, etc.

Of those, preferred are trialkylaluminiums and alkylaluminium hydrides where p=1 and q=3. More preferred are trialkylaluminium where $R^{31}$ has from 1 to 8 carbon atoms.

(4) Catalyst Formation, Prepolymerization

The catalyst may be formed by simultaneously or continuously adding the above-mentioned catalyst components (A) to (C) all at once or in plural times to a (pre)polymerization tank and are kept in contact with each other therein.

In general, the components are brought into contact with each other in an aliphatic hydrocarbon or aromatic hydrocarbon solvent. The contact temperature is not specifically limited, but is preferably from −20° C. to 150° C. Regarding the order for contact, any purposeful combination is employable, and especially preferred orders are shown below with respect to the constituent components.

In a case where the catalyst component (C) is used, the catalyst component (C) may be brought into contact with the catalyst component (A) or the catalyst component (B) before the catalyst component (A) and the catalyst component (B) are brought into contact with each other, or the catalyst component (C) may be brought into contact with both the catalyst component (A) and the catalyst component (B), or simultaneously with contact between the catalyst component (A) and the catalyst component (B), the catalyst component (C) may be brought into contact with the two, or the catalyst component (C) may be brought into contact after the catalyst component (A) and the catalyst component (B) have been brought into contact with each other. Preferred is a method where any of the catalyst component (A) and the catalyst component (B) is brought into contact with the catalyst component (C) before the former two are brought into contact with each other.

After the components have been brought into contact with each other, the resultant mixture may be washed with an aliphatic hydrocarbon or aromatic hydrocarbon solvent.

The amount of the catalyst components (A), (B) and (C) to be used is any arbitrary one. For example, the amount of the catalyst component (A) to be used is preferably within a range of from 0.1 μmol to 1,000 μmol relative to one g of the catalyst component (B), more preferably from 0.5 μmol to 500 μmol. The amount of the catalyst component (C) relative to the catalyst component (A) is, as a molar ratio of the transition metal, preferably within a range of from 0.01 to $5 \times 10^6$, more preferably from 0.1 to $1 \times 10^4$.

The proportion of the component [A-1] (compound represented by the general formula (a1)) to the component [A-2] (compound represented by the general formula (a2)) is any arbitrary one within a range satisfying the above-mentioned characteristics of the propylene polymer, but preferably, the molar ratio of the transition metal in [A-1] to the total amount of the components [A-1] and [A-2] is 0.30 or more and 0.99 or less.

By varying the proportion, the balance between the melt properties and the catalyst activity can be controlled. In other words, the component [A-1] produces a low-molecular-weight terminal vinyl macromer, and the component [A-2] produces a high-molecular-weight form partially copolymerized with a macromer. Accordingly, by varying the proportion of the component [A-1], the mean molecular weight of the polymer to be formed, the molecular weight distribution, deviation to the high-molecular-weight side of the molecular weight distribution, an extremely high-molecular-weight component, and branching (amount, length, distribution) can be controlled, whereby the melt properties such as the rate of strain hardening, the melt tension and the melt ductility can be controlled.

For producing a propylene polymer having an extremely high rate of strain hardening, the value must be 0.30 or more, preferably 0.40 or more, more preferably 0.5 or more. The upper limit is 0.99 or less, and for effectively obtaining the polypropylene resin (X) at a high catalyst activity, it is preferably 0.95 or less, more preferably within a range of 0.90 or less.

Using the component [A-1] within the above-mentioned range makes it possible to control the balance between the mean molecular weight and the catalyst activity, relative to the hydrogen amount.

The catalyst in the present invention is subjected to prepolymerization treatment including minor polymerization through contact of the catalyst with an olefin. The prepolymerization treatment prevents gel formation during the intended real polymerization. The reason may be considered to be because the long-chain branching among the polymer particles could be uniformly distributed during real polymerization, and because of the reason, the melt properties could be thereby improved.

The olefin to be used for prepolymerization is not specifically defined, and examples thereof include propylene, ethylene, 1-butene, 1-hexene, 1-octene, 4-methyl-1-pentene, 3-methyl-1-butene, vinylcycloalkane, styrene, etc. As the olefin feeding method, any known method is employable, including a feeding method where an olefin is fed into a reactor while kept at a constant rate or under a constant pressure condition, a method of combination thereof, a method of stepwise changing the condition, etc.

The prepolymerization temperature and time is not specifically limited. Preferably, the temperature falls within a range of from −20° C. to 100° C., and the time falls within a range of from 5 minutes to 24 hours. Regarding the prepolymerization amount, the prepolymerized polymer amount is preferably from 0.01 to 100 relative to the catalyst component (B), more preferably from 0.1 to 50. During prepolymerization, the catalyst component (C) may be added or may be added later. After prepolymerization the catalyst may be washed.

During or after contact of the above-mentioned components with each other, a polymer such as polyethylene, polypropylene or the like, and a solid of an inorganic oxide such as silica, titanic or the like may be made to be present in the reaction system, and the method is employable here.

(5) Use of Catalyst/Propylene Polymerization

The polymerization mode may be any and every one in which the olefin polymerization catalyst containing the catalyst component (A), the catalyst component (B) and the catalyst component (C) can be efficiently kept in contact with monomer.

Specifically, herein employable are a slurry method using an inert solvent, a so-called bulk method using propylene as a solvent but not substantially using an inert solvent, a solution polymerization method, a gas-phase method where monomers are kept gaseous substantially not using a liquid solvent, etc. In addition, a continuous polymerization or batchwise polymerization method is also employable. Further, two or more multistage polymerization is employable in addition to single-stage polymerization.

In the case of slurry polymerization, a saturated aliphatic or aromatic hydrocarbon such as hexane, heptane, pentane, cyclohexane, benzene, toluene or the like may be used either singly or as a mixture thereof as the polymerization catalyst.

The polymerization temperature is preferably 0° C. or higher and 150° C. or lower. In particular, in bulk polymerization, the temperature is preferably 40° C. or higher, more preferably 50° C. or higher. The upper limit is preferably 80° C. or lower, more preferably 75° C. or lower.

Further, in a case of gas-phase polymerization, the temperature is preferably 40° C. or higher, more preferably 50° C. or higher. The upper limit is preferably 100° C. or lower, more preferably 90° C. or lower.

The polymerization pressure is preferably 1.0 MPa or higher and 5.0 MPa or lower. In particular, in bulk polymerization, the pressure is preferably 1.5 MPa or higher, more preferably 2.0 MPa or higher. The upper limit is preferably 4.0 MPa or lower, more preferably 3.5 MPa or lower.

Further, in a case of gas-phase polymerization, the pressure is preferably 1.5 MPa or higher, more preferably 1.7 MPa or higher. The upper limit is preferably 2.5 MPa or lower, more preferably 2.3 MPa or lower.

Further, as a molecular weight regulator, hydrogen may be used supplementarily for activity enhancement, in an amount as a molar ratio to propylene of $1.0 \times 10^{-6}$ or more and $1.0 \times 10^{-2}$ or less.

By varying the amount of hydrogen to be used, the mean molecular weight of the polymer to be formed, and in addition thereto, the molecular weight distribution, deviation to the high-molecular-weight side of the molecular weight distribution, an extremely high-molecular-weight component, and branching (amount, length, distribution) can be controlled, whereby the melt properties such as the rate of strain hardening, the melt tension and the melt ductility can be controlled, and accordingly, the melt properties that characterize polypropylene having a long-chain branched structure, such as MFR, rate of strain hardening, melt tension MT and melt ductility, can be thereby controlled.

Preferably, hydrogen is used in an amount as a molar ratio to propylene of $1.0 \times 10^{-6}$ or more, more preferably $1.0 \times 10^{-5}$ or more, even more preferably $1.0 \times 10^{4}$ or more. The upper limit is preferably $1.0 \times 10^{-2}$ or less, more preferably $0.9 \times 10^{-2}$ or less, even more preferably $0.8 \times 10^{-2}$ or less.

In addition to propylene monomer, any other α-olefin comonomer having from 2 to 20 carbon atoms except propylene, for example, ethylene and/or 1-butene may be used as comonomer for copolymerization depending on the intended use.

For obtaining those having a good balance between catalyst activity and melt properties as the polypropylene resin (X) for use in the present invention, it is desirable that ethylene and/or 1-butene is used in an amount of 15 mol % or less relative to propylene, more preferably 10.0 mol % or less, even more preferably 7.0 mol % or less.

In propylene polymerization using the catalyst and the polymerization method exemplified herein, a so-called macromer in which the polymer semiterminal shows mainly a propenyl structure is formed from the active species derived from the catalyst component [A-1] through specific chain-transfer reaction that is generally referred to as β-methyl elimination. It is considered that the macromer can form a polymer having a higher molecular weight, and is taken in the active species derived from the catalyst component [A-2] with better copolymerizability to thereby promoter macromer copolymerization. Accordingly, it is considered that the branch structure of the polypropylene resin having a long-chain branched structure to be formed would be mainly a comb-shaped chain.

2)-8. Other Characteristics of Polypropylene Resin (X) having Long-Chain Branched Structure One other additional characteristic feature of the polypropylene resin (X) having a long-chain branched structure for use in the present invention that is produced according to the above-mentioned method is that the rate of strain hardening (λmax(0.1)) thereof in measurement of elongation viscosity at a rate of strain of $0.1\ \mathrm{s}^{-1}$ is 6.0 or more.

The rate of strain hardening (λmax(0.1)) is an index of expressing a viscosity in melt, and when the value is large, the melt tension can be effectively increased. As a result, in a firing test, the resin can exhibit high-level drip resistance. The rate of strain hardening is preferably 6.0 or more for expressing drip resistance, more preferably 8.0 or more. On the other hand, when the rate of strain hardening is too high, it may have some negative influence on moldability, and therefore the value is preferably 30 or less, more preferably 20 or less. The rate of strain hardening is preferably controlled to fail within the range, within which the resin can keep high-level drip resistance and can attain high-level flame retardance and can keep good moldability.

The details of a calculation method for λmax(0.1) are described below. λmax(0.1) calculation method The elongation viscosity at a temperature of 180° C. and at a strain rate of 0.1 s$^{-1}$ is plotted on a double logarithmic graph in which the horizontal axis indicates time t (see) and the vertical axis indicate elongation viscosity $\eta_E$ (Pa·sec). On the double logarithmic graph, the viscosity just before hardening is approximated in a straight line.

Specifically, first, the elongation viscosity is plotted relative to the time, and the inclination at each time is determined. For this, the matter that the found data of the elongation viscosity are discrete is taken into consideration, and various averaging methods are used. For example, employable is a method where the inclination of adjacent data is read, and the moving average of some peripheral points is calculated.

The elongation viscosity is a monotonically increasing function in the range of a low strain amount, and gradually reaches a constant level. In the absence of strain hardening, the elongation viscosity is to be the same as the Trouton's viscosity after a sufficient period of time, but in the presence of stain hardening, in general, the elongation viscosity begins to increase with the lapse of time from the strain amount strain rate×time) of about 1. Specifically, the inclination tends to decrease with the lapse of time in a low strain region, but on the contrary, it tends to increase from a strain amount of about 1, and on the curve drawn by plotting the elongation viscosity relative to time, there exists an inflection point. Accordingly, within a strain amount range of from 0.1 to 2.5 or so, the point at which the inclination at each time as obtained in the above could be a minimum value is determined, and a contact line is drawn on the point, and the straight line is extrapolated until the strain amount could reach 4.0. The maximum value (ηmax) of the elongation viscosity $\eta_E$ until the strain amount could each 4.0 is determined, and the viscosity on the approximated straight line until that time is referred to as ηlin. ηmax/ηlin is defined as λmax(0.1). The devices and others actually used in Examples in this description are as described in the section of Examples to be given hereinunder.

Preferably, the polypropylene resin (X) having a long-chain branched structure for use in the present invention has high-level stereoregularity, by which molded articles having high rigidity can be produced. The polypropylene resin (X) having a long-chain branched structure is a horn polypropylene (propylene homopolymer), or may be a propylene-α-olefin random copolymer with a small amount of any other commoner such as an α-olefin having from about 2 to 8 carbon atoms such as ethylene, 1-butene, 1-hexene or the like so far as the copolymer satisfies various characteristic features mentioned above. In a case where the polypropylene resin (X) is a homopolypropylene, the crystallinity thereof is high and the inciting point thereof is high, but also in a case where the polypropylene resin (X) is a propylene-α-olefin random copolymer, the melting point thereof is preferably high.

More specifically, the melting point measured through differential scanning calorimetry (DSC) is preferably 145° C. or higher, more preferably 150° C. or higher. When the melting point is 145° C. or higher, the resin is preferred from the viewpoint of the heat resistance of products, and the upper limit of the melting point of the polypropylene resin (X) is generally 170° C.

The melting point can be measured through differential scanning calorimetry (DSC), in which a sample is once heated up to 200° C. to erase the thermal history thereof, then cooled down to 40° C. at a cooling rate of 10° C./min, and again heated at a heating rate of 10° C./min, and in this cycle, the endothermic peak top temperature is the melting point. The devices and others actually used in Examples in this description are as described in the section of Examples to be given hereinunder.

3). Formulation

Requirement (A-1)

The polypropylene resin (A) indispensably contains the polypropylene resin (Y). Using the polypropylene resin (Y) as one indispensable component in the polypropylene resin composition and its molded article of the present invention makes it possible to maintain good basic properties of the polypropylene resin composition and its molded article of the present invention that have high rigidity and good moldability with keeping suitable flowability.

Requirement (A-2)

The polypropylene resin (A) is characterized by containing at least one polypropylene resin selected from a group consisting of the above-mentioned polypropylene resin (Y) and the polypropylene resin (X) having a king-chain branched structure. In particular, in a case where the characteristics that the polypropylene resin (Y) has in the polypropylene resin composition and its molded article of the present invention are further enhanced, or in a case where any characteristics of having a suitable melt tension and therefore having good drip resistance and newly exhibiting high-level flame retardance as the other characteristics are given to the resin composition or its molded article, use of the polypropylene resin (X) having a long-chain branched structure is effective.

The polypropylene resin (A) satisfies both the requirements (A-1) and (A-2), in which the polypropylene resin (Y) is an indispensable component but use of the polypropylene resin (X) having a long-chain branched structure is not always necessary depending on the object and the desired performance thereof. However, irrespective of the presence or absence of the polypropylene resin (X) having a long-chain branched structure therein, the polypropylene resin (A) must satisfy the composition range of the requirement (I) to be described hereinunder in the polypropylene resin composition and its molded article of the present invention for solution to problem.

Requirement (A-3)

In a case where the polypropylene resin (X) having a long-chain branched structure is used in the present invention, in general, the polypropylene resin (Y) is from 70 to 100% by weight and the polypropylene resin (X) having a long-chain branched structure is from 0 to 30% by weight relative to the total, 100% by weight, of the polypropylene resin (Y) and the polypropylene resin (X) having a long-chain branched structure, but preferably, the polypropylene resin (Y) is from 70 to 99% by weight and the polypropylene resin (X) having a long-chain branched structure is from 1 to 30% by weight More preferably, the polypropylene resin (Y) is from 75 to 90% by weight. On the other hand, the polypropylene resin (X) having a long-chain branched structure is more preferably from 10 to 25% by weight. Controlling the blending ratio of the polypropylene resin (Y) and the polypropylene resin (X) having a long-chain branched structure to all within the range realizes high rigidity and impact resistance, good molding workability and high-level drip resistance, therefore expressing high-level flame retardance.

Consequently, the present invention makes it possible to provide a flame-retardant material on a further higher level.

2. Fiber (B)

The fiber (B) for use in the present invention is at least one type of fiber (fibrous filler) selected from a group consisting of a glass fiber and a carbon fiber. The fiber (B) not only improves the physical properties such as rigidity, impact strength and the like of the polypropylene resin composition and its molded article of the present invention but also contributes toward improving additional properties thereof such as heat resistance, dimensional stability (reduction in the linear expansion coefficient, etc.), low-contractility, scratch resistance, etc.

(1) Type, Production

The fiber (B) is at least one type of fiber selected from a group consisting of a glass fiber and a carbon fiber as mentioned above, and preferably from the viewpoint of the advantageous effects of the present invention, and the easiness in production and the economic potential of the polypropylene resin composition and its molded article of the present invention, a glass fiber is preferred.

For further more improving the advantageous effects of the present invention, two or more types of the fiber (B) may be used as combined, and may be used in the form of a so-called master batch previously prepared by incorporating a relatively high concentration of the fiber (B) in the polypropylene resin (A).

Any others not corresponding to the fiber (B), for example, glass beads, glass balloons and mica, as well as various inorganic or organic fillers not corresponding to the fiber (B) may be used along with the fiber (B) within a range not remarkably detracting from the advantageous effects of the present invention.

(i) Glass Fiber

The glass fiber for use herein is not specifically limited, and regarding the type of glass for the fiber, for example, there are mentioned F glass, C glass, A glass, S glass, etc. Above all, E glass is preferred.

The production method for the glass fiber is not specifically limited, and the glass fiber may be produced various known production methods.

The fiber diameter of the glass fiber is preferably from 3 μm to 25 μm, more preferably from 6 μm to 20 μm. The length is preferably from 2 mm to 20 mm. The fiber diameter and the length may be obtained from the data measured with a microscope or a caliper.

When the fiber diameter is less than 3 μm, the glass may be readily broken during production of the polypropylene resin composition and its molded article of the present invention and during molding the composition. On the other hand, when more than 25 μm, the effect of improving the rigidity and the impact strength of the polypropylene resin composition and its molded article of the present invention may degrade owing to the reduction in the aspect ratio of the fiber.

Though depending on the glass fiber to be used, the fiber length is preferably from 2 mm to 20 mm as described above. When less than 2 mm, the fiber may worsen the physical properties such as rigidity and impact strength of the polypropylene resin composition and its molded article of the present invention, but on the other hand, when more than 20 mm, the moldability (flowability) may worsen. The fiber length in this case may also be expressed as the length thereof in a case where the glass fiber is used as a source material directly as it is. However this may not apply to a case where a large number of continuous glass fibers produced through melt extrusion to be mentioned below are aggregated and integrated to give glass-fiber containing pellets, and in general, glass roving is used. Two or more different types of glass fiber may be used as combined.

The glass fiber for use herein may be a surface-treated one or an untreated one. For improving the dispersibility in the polypropylene resin (A), the glass fiber is preferably surface-treated with an organic silane coupling agent, a titanate coupling agent, an aluminate coupling agent, a zirconate coupling agent, a silicone compound, a higher fatty acid, a fatty acid metal salt, a fatty acid ester or the like.

The organic silane coupling agent for use for surface treatment includes, for example, vinyltrimethoxysilane, γ-chloropropyltrimethoxysilane, γ-methacryloxypropyltrimethoxysilane, γ-aminopropyltrimethoxysilane, 3-acryloxypropyltrimethoxysilane, etc. The titanate coupling agent includes, for example, isopropyltriisostearoyl titanate, isopropyltris(dioctylpyrophosphate) titanate, isopropyltri(N-aminoethyl) titanate, etc. The aluminate coupling agent includes, for example, acetoalkoxyaluminium diisopropylate, etc. The zirconate coupling agent includes, for example, tetra(2,2-diallyloxymethyl)butyl, di(tridecyl)phosphite zirconate; neopentyl(diallyl)oxy, trineodecanoyl zirconate. The silicone compound includes silicone oil, silicone resin, etc.

Further, the higher fatty acid for use for surface treatment includes, for example, oleic acid, capric acid, lauric acid, palmitic acid, stearic acid, montanic acid, kareic acid, linolic acid, rosin acid, linoleic acid, undecanoic acid, undecenoic acid, etc. The higher fatty acid metal salt includes a sodium salt, a lithium salt, a calcium salt, a magnesium salt, a zinc salt, an aluminium salt or the like of a fatty acid having 9 or more carbon atoms, such as stearic acid, montanic acid, etc. Above all, calcium stearate, aluminium stearate, calcium montanate and sodium montanate are preferred. Examples of the fatty acid ester include a polyalcohol fatty acid ester such as a glycerin fatty acid ester, etc.; an alpha-sulfonic acid fatty acid ester, a polyoxyethylene sorbitan fatty acid ester, a sorbitan fatty acid ester, a polyethylene fatly acid ester, a sucrose fatty acid ester, etc.

The amount of the surface-treating agent to be used is not specifically limited. Preferably, the amount is from 0.01 parts by weight to 5 parts by weight relative to 100 parts by weight of the glass fiber, more preferably from 0.1 parts by weight to 3 parts by weight.

The glass fiber for use herein may be surface-treated for sizing with a sizing agent. Regarding the type of the sizing agent, there are mentioned an epoxy sizing agent, an aromatic urethane sizing agent, an aliphatic urethane sizing agent, an acrylic sizing agent, a maleic anhydride-modified polyolefin sizing agent, etc.

The sizing agent must melt in melt-kneading with the polypropylene resin (A), and preferably, the agent melts at 200° C. or lower.

The glass fiber may be used as a so-called chopped strand glass fiber prepared by cutting an original fiber into fiber pieces having a desired length. For more enhancing the effect of improving the rigidity and the impact strength of the polypropylene resin composition and its molded article of the present invention, the chopped strand glass fiber is preferably used.

As specific examples of the glass fiber, there are mentioned those manufactured by JEOL (T480H), etc.

The glass fiber may also be used as "glass fiber-containing pellets" that are produced by previously aggregating and integrating an arbitrary amount of, for example, the polypropylene resin (A) and a large number of continuous glass fibers prepared through melt extrusion to give pellets, in which the length of the glass fibers in the pellets is substantially the same as the length of one side (extrusion direction) of the pellets, and use of the pellets is more preferred from the viewpoint of more enhancing the physical properties such as the rigidity and the impact strength of the polypropylene resin composition and its molded article of the present invention. In this case, "substantially" means concretely that, based on the number of all the glass fibers in the glass fiber-containing pellets, the length of the glass fibers is the same as the length (in the extrusion direction) of the glass fiber-containing pellets in a ratio of 50% or more, preferably 90% or more, and during the preparation of the pellets, the fibers are not almost broken.

The production method for the glass fiber-containing pellets is not specifically limited. For example, preferred is a method (pultrusion molding method) where a large number of continuous glass fibers are, while kept drawn through a crosshead die from a fiber rack, aggregated and integrated with an arbitrary amount of the component (A) in a mode of melt extrusion (immersion) in a melt state using a resin extruder, since the fibers are not almost broken during the method.

The length (in the extrusion direction) of the glass fiber-containing pellets is preferably from 2 mm to 20 mm like in the above, though depending on the glass fiber to be used. When the length is less than 2 mm, the fiber may worsen the physical properties such as the rigidity and the impact strength of the polypropylene resin composition and its molded article of the present invention, while on the other hand, when more than 20 mm, the fiber may worsen the moldability (flowability) thereof.

In the glass fiber-containing pellets, the content of the glass fiber is preferably from 20% by weight to 70% by weight based on 100% by weight of the entire pellets.

In a case where the glass fiber-containing pellets in which the content of the glass fiber is less than 20% by weight are used in the present invention, they may worsen the physical properties such as the rigidity and the impact strength of the polypropylene resin composition and its molded article of the present invention, while on the other hand, in a case where those in which the content is more than 70% by weight are used, they may worsen the moldability (flowability) thereof.

(ii) Carbon Fiber

The size and the type of the carbon fiber are not specifically limited, and ultrafine ones having a fiber diameter of 500 nm or less and called ultrafine carbon fibers may also be used. Preferably, the fiber diameter is from 2 μm to 20 μm, more preferably from 3 μm to 15 μm. When the fiber diameter is less than 2 μm, the carbon fiber would be readily broken during production and molding of the polypropylene resin composition and its molded article of the present invention, and if so, the effect of enhancing the physical properties such as the rigidity and the impact strength of the polypropylene resin composition and its molding of the present invention may degrade.

When the fiber diameter is more than 20 μm, the effect of enhancing the rigidity and the impact strength of the polypropylene resin composition and its molded article of the present invention may degrade owing to the reduction in the aspect ratio of the fiber.

Here, the method for measurement of the fiber diameter is a known method, and for example, there is mentioned JIS 87607 (2000) (formerly JIS R7601) and a microscopic observation method.

The fiber length of the carbon fiber is preferably from 1 mm to 20 mm, more preferably from 3 mm to 10 mm.

In this case, the fiber length is the length of the carbon fiber that is used as a starting material directly as it is. However, this does not apply to the case of "carbon fiber-containing pellets" produced by aggregating and integrating a large number of continuous carbon fibers prepared through melt extrusion, as described hereinunder. In general, roving fibers are used.

When the fiber length is less than 1 mm, the final fiber length after production and molding of the polypropylene resin composition and its molded article of the present invention would be shorter so that the physical properties such as the rigidity and the impact strength of the polypropylene resin composition and its molded article of the present invention would be thereby worsened, but on the other hand, when more than 20 mm, the fibers may worsen the moldability (flowability) of the resin composition. Two or more types of carbon fibers may be used as combined.

The type of the carbon fiber is not specifically limited as described above. For example, there are mentioned a PAN (polyacrylonitrile) carbon fiber produced from acrylonitrile as the main material, a pitch carbon fiber produced from tar pitch as the main material, and a rayon carbon fiber, etc. Any of these are favorably used. The applicability of these fibers in the present invention is high, but rather from the viewpoint of the composition purity and the uniformity, a PAN carbon fiber is preferred. One alone or two or more of these may be used either singly or as combined. The production method for the carbon fiber is not specifically limited.

Regarding specific examples of the carbon fiber, Mitsubishi Rayon's trade name "Pyrofil", Toray's trade name "Torayca", Toho Tenax's trade name "Besfight" and the like are mentioned for PAN carbon fibers, and Mitsubishi Plastics' trade name "Dialead", Osaka Gas Chemical's trade name "Donacarbo", Kureha Chemical's "Kreca" and the like are for pitch carbon fibers.

Carbon fiber generally has a tensile elastic modulus of from 200 GPa to 1000 GPa or so, but from the viewpoint of the strength and the economic potential of the polypropylene resin composition and its molded article of the present invention, those having from 200 GPa to 900 GPa are preferred, and those having from 200 GPa to 300 GPa are more preferred.

Carbon fiber generally has a density of from 1.7 g/cm$^3$ to 5 g/cm$^3$ or so, but from the viewpoint of lightweightness and economic potential, those having a density of from 1.7 g/cm$^3$ to 2.5 g/cm$^3$ or so are preferred for use herein.

Here, the measurement methods for the tensile elastic modulus and the density are known methods. For example, for the tensile elastic modulus, there is mentioned JIS 87606 (2000) (formerly JIS R7601), and similarly, for the density, for example, there is mentioned JIS 87603 (1999) (formerly JIS R7601).

The carbon fiber may be used as a so-called chopped (strand-like) carbon fiber prepared by cutting an original fiber into fiber pieces having a desired length (hereinafter this may be simply referred to as CCF). If desired, the fiber may be one subjected to sizing treatment with an each type of sizing agents. In the present invention, for more enhancing the effect of improving various physical properties such as low contractility, scratch resistance, rigidity and impact strength of the fiber-reinforced composition and its molded article of the present invention, CCF is preferably used.

Specific examples of CCF include Mitsubishi Rayon's trade name "Pyrofil Chop", Toray's trade name "Torayca Chop", Toho Tenax's trade name "Besfight Chop" for PAN carbon fibers, and Mitsubishi Plastics' trade name "Dialead Chopped Fiber", Osaka Gas Chemical's trade name "Donacarbo Chop", Kureha Chemical's "Kreca Chop" and the like for pitch carbon fibers.

The carbon fiber may also be used as "carbon fiber-containing pellets" that are produced by previously aggregating and integrating an arbitrary amount of, for example, the polypropylene resin (A) and a large number of continuous carbon fibers prepared through melt extrusion to give pellets, in which the length of the carbon fibers in the pellets is substantially the same as the length of one side (extrusion direction) of the pellets, and use of the pellets is more preferred front the viewpoint of more enhancing the physical properties such as the rigidity and the impact strength of the polypropylene resin composition and its molded article of the present invention. In this case, "substantially" means concretely that, based on the number of all the carbon fibers in the carbon fiber-containing pellets, the length of the carbon fibers is the same as the length (in the extrusion direction) of the carbon fiber-containing pellets in a ratio of 50% or more, preferably 90% or more, and during the preparation of the pellets, the fibers are not almost broken.

The production method for the carbon fiber-containing pellets is not specifically limited. For example, preferred is a method (pultrusion molding method) where a large number of continuous carbon fibers are, while kept drawn through a crosshead die from a fiber rack, aggregated and integrated with an arbitrary amount of the component (A) in a mode of melt extrusion (immersion) in a melt state using a resin extruder, since the fibers are not almost broken during the method.

The length (in the extrusion direction) of the carbon fiber-containing pellets is preferably from 2 mm to 20 mm, though depending on the carbon fiber to be used. When the length is less than 2 mm, the fiber may worsen the physical properties such as the rigidity and the impact strength of the polypropylene resin composition and its molded article of the present invention, while on the other hand, when more than 20 mm, the fiber may worsen the moldability (flowability) thereof.

In the carbon fiber-containing pellets, the content of the carbon fiber is preferably from 20% by weight to 70% by weight based on 100% by weight of the entire pellets.

In a case where the carbon fiber-containing pellets in which the content of the carbon fiber is less than 20% by weight are used in the present invention, they may worsen the physical properties such as the rigidity and the impact strength of the polypropylene resin composition and its molded article of the present invention, while on the other hand, in a case where those in which the content is more than 70% by weight are used, they may worsen the moldability (flowability) thereof.

3. Organic Flame Retardant (C)

The organic flame retardant (C) for use in the present invention may be any organic flame retardant generally usable as flame retardants for polyolefins, and any of various organic flame retardants such as halogen-containing, phosphorus-containing or guanidine-containing flame retardants or melamine-cyanuric acid derivatives and the like are usable.

The halogen-containing flame retardants include, for example, organic halogenated aromatic compounds such as halogenated diphenyl compounds, halogenated bisphenol compounds, halogenated bisphenol-bis(alkylether) compounds, halogenated phthalimide compounds, etc. Halogenated bisphenol-bis(alkylether) compounds are used in many cases.

The halogenated diphenyl compounds include, for example, halogenated diphenylether compounds, halogenated diphenylketone compounds, halogenated diphenylalkane compounds, etc. Above all, halogenated diphenylalkane compounds such as decabromodiphenylethane and the like are used in many cases.

The halogenated bisphenol compounds include, for example, halogenated bisphenylalkanes, halogenated bisphenyl ethers, halogenated biphenyl thioethers, halogenated bisphenyl sulfones, etc. Above all, halogenated bisphenyl thioethers such as bis(3,5-dibromo-4-hydroxyphenyl)sulfone and the like are used in many cases.

The halogenated bisphenol bis(alkylether) compounds include, for example, (3,5-dibromo-4-2,3-dibromopropoxyphenyl)-(3-bromo-4-2,3-dibromopropoxyphenyl)ethane, 1-(3,5-dibromo-4-2,3-dibromopropoxyphenyl)-2-(3-bromo-4-2,3-dibromopropoxyphenyl)propane, 1-(3,5-dibromo-4-2,3-dibromopropoxyphenyl)-3-(3-bromo-4-2,3-dibromopropoxyphenyl)propane, 2,2-bis(3,5-dibromo-4-2,3-dibromopropoxyphenyl)propane, (3,5-dichloro-4-2,3-dibromopropoxyphenyl)-(3-chloro-4-2,3-dibromopropoxyphenyl)methane, 1-(3,5-dichloro-4-2,3-dibromopropoxyphenyl)-2-(3-chloro-4-2,3-dibromopropoxyphenyl)ethane, 1-(3,5-dichloro-4-2,3-dibromopropoxyphenyl)-3-(3-chloro-4-2,3-dibromopropoxyphenyl)propane, bis(3,5-dibromo-4-2,3-dibromopropoxyphenyl)methane, 1,2-bis(3,5-dibromo-4-2,3-dibromopropoxyphenyl)ethane, 1,3-bis(3,5-dibromo-4-2,3-dibromopropoxyphenyl)propane, bis(3,5-dichloro-4-2,3-dibromopropoxyphenyl)methane, 1,2-bis(3,5-dichloro-4-2,3-dibromopropoxyphenyl)ethane, 1,3-bis(3,5-dichloro-4-2,3-dibromopropoxyphenyl)propane, 2-bis(3,5-dichloro-4-2,3-dibromopropoxyphenyl)propane, (3,5-dibromo-4-2,3-dibromopropoxyphenyl)-(3-bromo-4-2,3-dibromopropoxyphenyl)ketone, (3,5-dichloro-4-2,3-dibromopropoxyphenyl)-(3-chloro-4-2,3-dibromopropoxyphenyl)ketone, bis(3,5-dibromo-4-2,3-dibromopropoxyphenyl)ketone, bis(3,5-dichloro-4-2,3-dibromopropoxyphenyl)ketone, (3,5-dibromo-4-2,3-dibromopropoxyphenyl)-(3-bromo-4-2,3-dibromopropoxyphenyl)ether, chloro-4-2,3-dibromopropoxyphenyl)-(3-chloro-4-2,3-dibromopropoxyphenyl)ether, bis(3,5-dibromo-4-2,3-dibromopropoxyphenyl)ether bis(3,5-dichloro-4-2,3-dibromopropoxyphenyl)ether, (3,5-dibromo-4-2,3-dibromopropoxyphenyl)-(3-bromo-4-2,3-dibromopropoxyphenyl)thioether, (3,5-dichloro-4-2,3-dibromopropoxyphenyl)-(3-chloro-4-2,3-dibromopropoxyphenyl)thioether, bis(3,5-dibromo-4-2,3-dibromopropoxyphenyl)thioether, bis(3,5-dichloro-4-2,3-dibromopropoxyphenyl)thioether, (3,5-dibromo-4-2,3-dibromopropoxyphenyl)-(3-bromo-4-2,3-dibromopropoxyphenyl)sulfone, (3,5-dichloro-4-2,3-dibromopropoxyphenyl)-(3-chloro-4-2,3-dibromopropoxyphenyl)sulfone, bis(3,5-dibromo-4-2,3-dibromopropoxyphenyl)sulfone, bis(3,5-dichloro-4-2,3-dibromopropoxyphenyl)sulfone, etc. Above all, brominated bisphenol A (brominated aliphatic ether), brominated bisphenol S (brominated aliphatic ether), chlorinated bisphenol A (chlorinated aliphatic ether) and chlorinated bisphenol S (chlorinated aliphatic ether), especially etherified tetrabromobispheriol A and etherified tetrabromobisphenol S are used in many cases.

Examples of the etherified tetrabromobisphenol A include tetrabromobisphenol A-bis(2,3-dibromopropyl ether) and 2,2-bis(3,5-dibromo-4-2,3-bromopropoxyphenyl)propane.

Examples of the etherified tetrabromobisphenol S include bis(3,5-dibromo-4-2,3-dibromopropoxyphenyl)sulfone.

One alone or two or more types of these halogen-containing flame retardants may be used either singly or as combined. For example, a halogenated diphenyl compound and a halogenated bisphenol compound may be used as combined.

In addition, any other organic flame retardant not corresponding to a halogen-containing flame retardant, such as a phosphorus-containing flame retardant and the like, may be used along with the halogen-containing flame retardant.

Among these halogen-containing flame retardants, a bromine-containing flame retardant is used in many cases as the flame-retardant effect thereof is high.

On the other hand, recently, phosphorus-containing flame retardants including organic phosphate compounds, phosphoric salt compounds and mixtures thereof are preferred from the viewpoint that halogen-containing flame retardants involve environmental load issues while such phosphorus-containing flame retardants are well dispersible in the polypropylene resin composition and its molding of the present invention and can express a high flame-retardant effect. In particular, phosphoric salt compounds are preferred.

Specifically, there are mentioned organic phosphate compounds such as triphenyl phosphate, tricresyl phosphate, bisphenol A bisdiphenyl phosphate, resorcinol bisdiphenyl phosphate, etc.; phosphoric salt compounds such as ammonium polyphosphate, polyphosphoric melamine salt, polyphosphoric piperazine salt, orthophosphoric piperazine salt, pyrophosphoric melamine salt, pyrophosphoric piperazine salt, polyphosphoric melamine salt, orthophosphoric melamine salt, calcium phosphate, magnesium phosphate, etc., and their mixtures, etc.

Compounds corresponding to the above-exemplified phosphoric salt compounds, in which melamine or piperazine is replaced by N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethyl-piperazine, 1,4-bis(2-aminoethyl)piperazine, 1,4-bis(3-aminopropyl)piperazine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine,2-amino-4,6-dimercapto-1,3,5-triaizne, ammeline, benzoguanamine, acetoguanamine, phthalodiguanamine, melamine cyanurate, melamine pyrophosphate, butylene-diguanamine, norbornenediguanamine, methylenediguanamine, ethylenedimelamine, trimethylenedimelamine, tetramethylenedimelamine, hexamethylenedimelamine, 1,3-hexylenedimelamine or the like, are also usable in the same manner as herein. As commercial products, there are mentioned Asahi Denka's Adekastab FP2000, FP2100, FP2200, ammonium polyphosphate, etc.

4. Polytetrafluoroethylene Resin (PTFE) (D)

The polytetrafluoroethylene resin (D) for use in the present invention is a homopolymer of tetrafluoroethylene or a copolymer consisting chiefly of tetrafluoroethylene. The comonomer to copolymerize with tetrafluoroethylene includes fluoro-olefins such as difluoroethylene, trifluoroethylene, hexafluoropropylene, chlorotrifluoroethylene, fluoroalkylethylene, perfluoroalkyl vinyl ether, etc.; and fluoroalkyl (meth)acrylates such as perfluoroalkyl (meth) acrylate, etc. The content of the copolymerizing component is preferably 10% by weight or less relative to the starting material tetrafluoroethylene.

The component (D) for use in the present invention may be in any form of PTFE particles, an aqueous dispersion of PTFE particles, a so-called "master batch" prepared by kneading PTFE with, for example, a polypropylene resin (A), etc. Among these, preferred is use of PTFE particles in view of the availability and easy handleability thereof and from the viewpoint that the amount thereof to be used may be accurately perceived and that foreign substances can be readily removed. As PTFE particles, commercial products may be used, or an aqueous dispersion of PTFE particles may be first prepared and then dried to give the particles according to the method to be mentioned below.

Typical examples of commercially-available source materials for aqueous dispersions of polytetrafluoroethylene particles include Asahi Glass's Fluon AD-1, AD-936, Daikin Industries' Polyflon D-1, D-2, Du Pont-Mitsui Fluorochemicals' Teflon 3W (Teflon is a registered trademark), etc.

The aqueous dispersion of PTFE particles may be obtained through polymerization of a tetrafluoroethylene monomer and, if desired, a suitable comonomer according to an emulsion polymerization method using a fluororine-containing surfactant. Preferably, the particle size of the aqueous dispersion of PTFE particles is from 0.05 to 1.0 μm.

Thus obtained, the aqueous dispersion of PTFE particles may be formed into a powder by putting it into hot water of a metal salt such as calcium chloride, magnesium sulfate or the like dissolved therein followed by salting out, coagulation and drying, or by spray-drying. As described above, it is desirable that the resultant powder is used as it is, but the powder may be mixed in a matrix resin such as polypropylene or the like along with a molding aid such as an antioxidant, a stabilizer, a lubricant or the like, and may be melt-kneaded to prepare a PTFE master batch before use.

As the case may be, a polymerizing vinyl compound may be polymerized in the aqueous dispersion of PTFE particles to modify PTFE. The PTFE-modified derivative obtained in the case firms a uniform mixture of PTFE and a polymer of the vinyl compound, and the ability thereof to mix with polypropylene may improve, as the case may be.

The polymerizing vinyl compound includes aromatic vinyl monomers such as styrene, α-methylstyrene, o-methylstyrene, t-butylstyrene, o-ethylstyrene p-chlorostyrene, o-chlorostyrene, 2,4-dichlorostyrene, p-methoxystyrene, o-methoxystyrene, 2,4-dimethylstyrene, etc.; (meth)acrylate monomers such as methyl (meth)acrylate, ethyl (meth)acrylate, butyl (meth)acrylate, 2-ethylhexyl (meth)acrylate, dodecyl (meth)acrylate, tridecyl (meth)acrylate, octadecyl (meth)acrylate, cyclohexyl (meth)acrylate, etc.; vinyl cyanide monomers such as acrylonitrile, methacrylonitrile, etc.; α,β-unsaturated carboxylic acids such as maleic anhydride, etc.; maleimide monomers such as N-phenylmaleimide, N-methylmaleimide, N-cyclohexylmaleimide, etc.; epoxy group-containing monomers such as glycidyl methacrylate, etc.; vinyl ether monomers such as vinyl methyl ether, vinyl ethyl ether, etc.; vinyl carboxylate monomers such as vinyl acetate, vinyl butyrate, etc.; α-olefin monomers such as ethylene, propylene, isobutylene, etc.; diene monomers such as butadiene, isoprene, dimethylbutadiene, etc. Above all, (meth)acryl monomer having a polar group are preferred. One or more of these monomers may be used either singly or as combined. The PTFE content in the modified PTFE is generally selected from a range of from 1 to 90% by weight.

Commercial products of acryl monomer-modified PTFE include Mitsubishi Rayon's thermoplastic resin modifiers (Metablen A-3000), etc.

While melt-kneaded with the polypropylene resin (A), PTFE is fibrillated by shearing force to form a fibrous network structure, and therefore has a function of improving the melt tension of a resin melt. For efficiently producing and dispersing the fibrils, one prepared by modifying PTFE with a special acrylic resin is preferred.

In the present invention, the component (D) may be melt-kneaded with a matrix resin to prepare a master batch to be used here. The master batch may be prepared by incorporating a suitable amount of a modified or unmodified PTFE powder in a matrix component such as a polypropylene resin or the like, mixing them in a tumbler mixer or a Henschel mixer, and pelleting it under a suitable melt condition using a twin-screw extruder or the like. In this case, if desired, various additives such as an antioxidant, a lubricant, a light stabilizer and the like may be incorporated in the mixture.

The fiber (B) and the organic flame retardant (C) may be previously mixed with the polypropylene resin (A), and then mixed with a master batch of the component (D). The component (A), the component (B), the component (C) and the component (D) may be mixed all at a time, and further, various additives may also be added thereto simultaneously.

5. Compounded Amount of Each Component

In the present invention, indispensably, the content of each component falls within a range that the polypropylene resin (A) is from 20 to 77 parts by weight, the fiber (B) is from 5 to 40 parts by weight, and the organic flame retardant (C) is from 18 to 40 parts by weight, and the total content of the polypropylene resin (A), the fiber (B) and the organic flame retardant (C) is 100 parts by weight, and further, the polytetrafluoroethylene resin (D) is from 0.01 to 1.5 parts by weight relative to 100 parts by weight of the total content of the polypropylene resin (A), the fiber (B) and the organic flame retardant (C) (requirement (I)). By defining the compounded amount of each component to fall within the range, the polypropylene resin composition and its molded article of the present invention can satisfy both self-extinguishing property and drip resistance and can express extremely high-level flame retardance, which, however, has heretofore been difficult in conventional technology, and can attain 5VA in UL94-5V while given mechanical properties (rigidity, impact), weather resistance and moldability.

The polypropylene resin (A) is preferably from 35 to 70 parts by weight, more preferably from 38 to 65 parts by weight, even more preferably from 40 to 60 parts by weight, especially preferably from 45 to 50 parts by weight.

The fiber (B) is preferably from 7 to 38 parts by weight, more preferably from 8 to 35 parts by weight, even more preferably from 10 to 30 parts by weight. When the compounded amount of the fiber (B) is lower than the range defined in the present invention, the mechanical properties (rigidity, impact) of the polypropylene resin composition and its molded article of the present invention may worsen. On the other hand, when higher than the range defined in the present invention, the moldability (flowability) may degrade.

Here, the compounded amount of the fiber (B) is the net weight thereof, and for example, in a case where the above-mentioned glass fiber-containing pellets are used, the amount is calculated on the basis of the actual content of the fiber (B) contained in the pellets.

The organic flame retardant (C) is preferably from 19 to 38 parts by weight, more preferably from 20 to 35 parts by weight, even more preferably from 23 to 32 parts by weight, especially preferably from 25 to 30 parts by weight. When the compounded amount of the organic flame retardant (C) is lower than the range defined in the present invention, sufficient flame retardance could not be realized, but on the other hand, when higher than the range defined in the present invention, it would worsen the moldability and would cause economic disadvantage.

The blending amount of each component of the polypropylene resin (A), the fiber (B) and the organic flame retardant (C) may be selected from the range of each component defined in the present invention so that the total amount of the polypropylene resin (A), the fiber (B) and the organic flame retardant (C) could be 100 parts by weight.

It is important that the polytetrafluoroethylene resin (D) is incorporated in an amount falling within a range of from 0.01 to 1.5 parts by weight relative to 100 parts by weight of the total of the polypropylene resin (A), the fiber (B) and the organic flame retardant (C), preferably from 0.02 to 1.0 parts by weight. More preferably from 0.05 to 0.5 parts by weight. Defining the compounded amount of the polytetrafluoroethylene resin (D) to fall within the range makes the polypropylene resin composition and its molded article of the present invention have good flame retardance and enables production of the molded article under a suitable condition. Specifically, when the amount is less than 0.01 parts by weight, the drip-preventing effect (drip resistance) in firing is insufficient, but when more than 1.5 parts by weight, the melt tension could increase but the melt ductility worsens and therefore the production tends to be difficult.

Here, the compounded amount of the polytetrafluoroethylene resin (D) is the net weight thereof, and for example, in a case where the above-mentioned master batch is used, the amount is calculated on the basis of the actual content of the polytetrafluoroethylene resin (D) contained in the master batch.

6. Optional Additive Component (E)

In the present invention, if desired, any ordinary optional additive component (E) may be incorporated within a range not significantly detracting the advantageous effects of the present invention, for example, for further enhancing the advantageous effects of the present invention and for giving any other effects, in addition to the polypropylene resin (A), the fiber (B), the organic flame retardant (C) and the polytetrafluoroethylene resin (D).

Specifically, the optional component includes a molecular weight depressant such as peroxides, etc.; a colorant such as pigments, etc.; an antioxidant such as modified polyolefins, phenolic, phosphorus-containing, sulfur-containing antioxidants, etc.; a light stabilizer such as hindered amines, etc.; a UV absorbent such as benzotriazoles, etc.; a nucleating agent such as sorbitols, etc.; an antistatic agent such as nonionic antistatic agents, etc.; a dispersant such as organic metal salts, etc.; a metal inactivator such as nitrogen compounds, etc.; an antibacterial/antifungal agent such as thiazoles, etc.; a plasticizer, a neutralizing agent, a lubricant, an elastomer (rubber component), a flame-retardant promoter such as metal oxides, etc.; any other polyolefin resin than the polypropylene resin (A) and the polytetrafluoroethylene resin (D), a thermoplastic resin such as polyamide resins, polyester resins, etc.; a filler except the fiber (B), such as talc, etc.; a flame retardant except the organic flame retardant (C), such as hydrated metal compounds, etc.

Two or more of these optional additive components may be used as combined, or may be added to the polypropylene resin composition of the present invention, or may be added to and mixed with each component of the polypropylene resin (A), the fiber (B), the organic flame retardant (C) and the polytetrafluoroethylene resin (D), and in each component, two or more of the optional components may be used as combined in the present invention, the compounded amount of the optional additive component (E) is not specifically limited, but is generally from 0 to 4.0 parts by weight or so relative to 100 parts by weight of the total amount of the polypropylene resin (A), the fiber (B) and the organic flame retardant (C).

(I) Species

As the molecular weight depressant, for example, various types of organic peroxides, those referred to as a decomposition (oxidation) accelerator and the like are usable, and organic peroxides are preferred.

As specific examples of organic peroxides, there are mentioned one or more selected from a group of benzoyl peroxide, t-butyl perbenzoate, t-butyl peracetate, t-butylperoxyisopropyl carbonate, 2,5-dimethyl-2,5-di(benzoylperoxy)hexane, 2,5-dimethyl-2,5-di(benzoylperoxy)hexyne-3, t-butyl diperadipate, t-butylperoxy-3,5,5-trimethylhexanoate, methylethyl ketone peroxide, cyclohexanone peroxide, di-t-butyl peroxide, dicumyl peroxide, 2,5-dimethyl-2,5-di-(t-butylperoxy)hexane, 2,5-dimethyl-2,5-di(t-butylperoxy)hexyne-3,1,3-bis(t-butylperoxyisopropyl)benzene, t-butylcumyl peroxide, 1,1-bis(t-butylperoxy)-3,3,5-trimethycyclohexane, 1,1-bis(t-butylperoxy)cyclohexane, 2,2-bis-t-butylperoxybutane, p-menthane hydroperoxide, diisopropylbenzene hydroperoxide, cumene hydroperoxide, t-butyl hydroperoxide, p-cymene hydroperoxide, 1,1,3,3-tetramethylbutyl hydroperoxide and 2,5-dimethyl-2,5-di(hydroperoxy)hexane. However, these are not limitative ones.

The colorant such as inorganic or organic pigments is effective for conferring and improving color appearance, flaw resistance, visual appearance, texture, product quality, weather resistance and durability of the polypropylene resin composition and its molded article of the present invention.

Specific examples of the inorganic pigments include carbon black such as furnace carbon and ketjen carbon; titanium oxides; iron oxides (such as colcothar); chromic acids (such as chrome yellow); molybdenum acids; selenium sulphides; ferrocyanides and the like, and the organic pigments include azo pigments such as hardly soluble azo lakes; soluble azo lakes; insoluble azo chelates; condensed azo chelates; other azo chelates, etc.; phthalocyanine pigments such as phthalocyanine blue and phthalocyanine green; threne pigments such as anthraquinone, perynone, perylene and thioindigo; lake dyes; quinacridone dyes; dioxazine dyes; isoindolinone dyes and the like. Aluminium flakes or pearl pigments may be added in order to confer metallic or pearl appearance. Dyes may also be added.

The light stabilizer and the UV absorbent such as hindered amine compounds, benzotriazol compounds, benzophenone compounds and salicylate compounds are effective for conferring and improving weather resistance and durability of the polypropylene resin composition and its molded article of the present invention.

Specific examples of the hindered amine compounds may include a condensation product of dimethyl succinate and 1-(2-hydroxyethyl)-4-hydroxy-2,2,6,6-tetramethyl piperidine; poly[[6-(1,1,3,3-tetramethylbutyl)imino-1,3,5-triazin-2,4-diyl][(2,2,6,6-tetramethyl-4-piperidyl)imino]hexamethylene [(2,2,6,6-tetramethyl-4-piperidyl)imino]]; tetrakis(2, 2,6,6-tetramethyl-4-piperidyl)1,2,3,4-butane tetracarboxylate; tetrakis(1,2,2,6,6-pentamethyl-4-piperidyl)1,2,3,4-butane tetracarboxylate; bis(1,2,2,6,6-pentamethyl-4-piperidyl)sebacate; bis-2,2,6,6-tetramethyl-4-piperidyl sebacate and the like, the benzotriazol compounds may include 2-(2'-hydroxy-3',5'-di-t-butylphenyl)-5-chlorobenzotriazole; 2-(2'-hydroxy-3'-t-butyl-5'-methylphenyl)-5-chlorobenzotriazole and the like, the benzophenone compounds may include 2-hydroxy-4-methoxybenzophenone; 2-hydroxy-4-n-octoxybenzophenone and the like and the salicylate compounds may include 4-t-butylphenyl salicylate; 2,4-di-t-butylphenyl 3',5'-di-t-butyl-4'-hydroxybenzoate and the like.

It is preferable to use the light stabilizer and the ultraviolet absorbing agent in combination because the effect for improving weather resistance and durability is enhanced.

The antioxidant such as phenol, phosphorus and sulfur antioxidants is effective for conferring and improving heat-resisting stability, process stability and thermal aging resistance of the polypropylene resin composition and its molded article of the present invention.

The antistatic agent such as nonionic and cationic antistatic agents is effective for conferring and improving antistatic property of the polypropylene resin composition and its molded article of the present invention.

The metal oxides (flame-retardant promoter) includes zinc oxide, iron oxide, aluminium oxide, molybdenum oxides, etc. More preferred metal oxides are zinc oxide and iron oxide, and those having a mean particle size of 30 vial or less, more preferably 10 µm or less, even more preferably 1 µm or less are preferred. A metal oxide whose mean particle size is larger than 30 µm is poorly dispersible in the polyolefin (A) and therefore could not realize high-level flame retardance. The amount of the metal oxide, if used, is preferably from 0.05 to 5 parts by weight relative to 100 parts by weight of the polypropylene resin (A), the fiber (B) and the organic flame retardant (C), more preferably from 0.1 to 3 parts by mass. When the amount is less than 0.05 parts by weight, a synergistic flame-retardant effect by sufficient addition could not be realized, but on the other hand, when a compounding amount of more than 5 parts by weight is uneconomical and disadvantageous.

The modified polyolefin is an acid modified polyolefin and/or a hydroxy modified polyolefin and is characterized in that it effectively confers functions such as mechanical properties especially rigidity, impact strength) in the present invention.

The acid modified polyolefin is not particularly limited and may be any conventional well known acid modified polyolefins.

The acid modified polyolefin is the one obtained by graft copolymerization of polyolefins such as polyethylenes, polypropylenes, ethylene-α-olefin copolymers, ethylene-α-olefin-unconjugated diene compound copolymers (EPDM and the like), ethylene-aromatic monovinyl compound-conjugated diene compound copolymerized rubbers and the like with unsaturated carboxylic acids such as maleic acid or maleic anhydride so as to effect modification. The graft copolymerization may be carried out by, for example, reaction of the polyolefin in a suitable solvent with the unsaturated carboxylic acid in the presence of a radical generating agent such as benzoyl peroxide. The component such as the unsaturated carboxylic acid and a derivative thereof may also be introduced in the polymer chain by random or block copolymerization using a monomer for the polyolefin.

The unsaturated carboxylic acid used for modification may include, for example, compounds having a polymerizable double bond and containing a carboxyl group and optionally a functional group including hydroxyl and amino groups such as maleic acid, fumaric acid, itaconic acid, acrylic acid and methacrylic acid.

The derivative of the unsaturated carboxylic acid may include acid anhydrides, esters, amides, imides and metal salts thereof which may specifically include maleic anhydride, itaconic anhydride, methyl acrylate, ethyl acrylate, butyl acrylate, methyl methacrylate, ethyl methacrylate, maleic acid monoethyl ester, maleic acid diethyl ester, fumaric acid monomethyl ester, fumaric acid dimethyl ester, acrylamide, methacrylamide, maleic acid monoamide, maleic acid diamide, fumaric acid monoamide, maleimide, N-butylmaleimide, sodium methacrylate and the like. Maleic anhydride is preferred.

The graft reaction may be carried out, for example, by using an organic peroxide such as dialkyl peroxides including di-t-butyl peroxide, t-butyl cumyl peroxide, dicumyl peroxide, 2,5-dimethyl-2,5-di(t-butylperoxy)hexane, 2,5-dimethyl-2,5-di(t-butylperoxy)hexyne-3 and the like; peroxy esters including t-butyl peroxyacetate, t-butyl peroxybenzoate, t-butyl peroxyisopropylcarbonate, 2,5-dimethyl-2,5-di (benzoylperoxy)hexane, 2,5-dimethyl-2,5-di(benzoylperoxy)hexyne-3 and the like; diacyl peroxides including benzoyl peroxide and the like; hydroperoxides such as diisopropylbenzene hydroperoxide, 2,5-dimethyl-2,5-di(hydroperoxy)hexane and the like in an amount of about 0.001 to 10 parts by weight relative to 100 parts by weight of the polyolefin and at a temperature of about 80 to 300° C. in melting or solution.

The degree of acid modification (which may also be referred to as grafting percentage) of the acid modified polyolefin is not particularly limited and is preferably, in terms of maleic anhydride, 0.05 to 10% by weight and more preferably 0.07 to 5% by weight.

The preferable acid modified polyolefin may include maleic anhydride modified polypropylenes.

The hydroxy modified polyolefin is a modified polyolefin containing a hydroxyl group. The modified polyolefin may contain the hydroxyl group at any position, for example at the terminal(s) of a main chain or in a side chain.

The olefin resin included in the hydroxy modified polyolefin may be exemplified by, for example, homopolymers or copolymers of an α-olefin such as ethylene, propylene, butene, 4-methylpentene-1, hexene, octene, nonene, decene, dodecene and the like and copolymers of the α-olefin and a copolymerizable monomer.

Preferred hydroxy modified polyolefin may be exemplified by hydroxy modified polyethylenes (such as low, medium or high density polyethylenes, linear low density polyethylenes, ultra-high molecular weight polyethylenes, ethylene-(meth)acrylic ester copolymers and ethylene-vinyl acetate copolymers), hydroxy modified polypropylenes (such as polypropylene homopolymers including isotactic polypropylenes, random copolymers of propylene and an α-olefin (for example, ethylene, butene and hexane), propylene-α-olefin block copolymers), hydroxy modified poly (4-methylpentene-1) and the like. The monomer used for introducing the reactive group may be exemplified by, for example, monomers having a hydroxyl group (for example, allyl alcohol, 2-hydroxyethyl (meth)acrylate, 2-hydroxypropyl (meth)acrylate and the like).

The degree of modification with the monomer containing a hydroxyl group is, relative to the olefin resin, 0.1 to 20% by weight and preferably 0.5 to 10% by weight. The average molecular weight of the hydroxy modified polyolefin is not particularly limited. The hydroxy modified polyolefin can be obtained by, when it has a low molecular weight, polymerizing a conjugated diene monomer with a well-known method such as anion polymerization, hydrolyzing the product and hydrogenating the obtained polymer.

Two or more types of these modified polyolefins may be used as combined.

(2) Blending Ratio

The amount of the modified polyolefin is, relative to the total amount the polypropylene resin (A), the fiber (B) and the organic flame retardant (C) of 100 parts by weight, 0 to 10 parts by weight, preferably 001 to 7 parts by weight, more preferably 0.5 to 5 parts by weight, still more preferably 1 to 3 parts by weight. When the amount of the modified polyolefin is higher than 10 parts by weight, impact strength and economic efficiency may degrade.

II. Production Method for Polypropylene Resin Composition, Production Method and Use of Molded Article 1. Production Method for Polypropylene Resin Composition The polypropylene resin composition of the present invention can be produced by blending, according to a well-known method, the polypropylene resin (A), the fiber (B), the organic flame retardant (C) and the polytetrafluoroethylene resin (D) and, if desired, the optional additive component (E) in the ratio described above and undergoing a kneading step wherein these components are melt-kneaded.

Mixing is usually carried out on a mixer such as a tumbler, a V blender and a ribbon blender. Melt-kneading is usually carried out on a kneading device such as a single-screw extruder, a twin-screw extruder, a Banbury mixer, a roll mixer, a Brabender plastograph, kneader and an agitation granulator, so that (semi) melt-kneading and granulation are carried out. When (semi) melt-kneading and granulation are carried out, the above components may be kneaded simultaneously or each component is separately kneaded in order to improve the properties. Namely, for example, some or all of the polypropylene resin (A), the organic flame retardant (C) and the polytetrafluoroethylene resin (D), and some of the fiber (B) may be kneaded prior to kneading and granulating the remaining components.

The polypropylene resin composition of the present invention is preferably produced by a combining method so that the average length of the fiber (B) is preferably 0.3 mm or more, more preferably 0.4 mm or more and 2.5 mm or less in the resin composition pellets or the molded article obtained after the kneading step wherein melt-kneading is carried out.

In this description, the average length of the fiber (B) in the resin composition pellets or in the molded article means the value obtained by averaging the values measured on a digital microscope. Specific measurement is carried out by, when the fiber (B) is glass fiber, burning the resin composition pellets or the molded article of the present invention, mixing the ash of the glass fiber with water containing a surfactant, dropping and spreading the mixed aqueous liquid on a thin glass plate, measuring the glass fiber length on a digital microscope (Type VHX-900 from Keyence Corporation) and calculating the average.

A preferable production method may include, for example during melt-kneading on a twin-screw extruder, sufficiently melt-kneading the polypropylene resin (A), the organic flame retardant (C) and the polytetrafluoroethylene (D) prior to feeding the fiber (B) according to a side feed method and dispersing the sized fibers while minimizing fracture and damage to the fibers.

Another preferred production method may include a so-called agitation granulation method in which, for example, the polypropylene resin (A), the fiber (B), the organic flame retardant (C) and the polytetrafluoroethylene resin (D) are agitated at high speed in a Henschel mixer to obtain semi-molten state while the fiber (B) in the mixture is kneaded, because this method allows easy dispersion of the fibers while minimizing fracture and damage to the fibers.

Another preferred production method may include a method in which the polypropylene resin (A), the organic flame retardant (C) and the polytetrafluoroethylene resin (D) except the fiber (B) are melt-kneaded in an extruder to obtain pellets which are then mixed with the above so-called "fiber (B) containing pellets" such as the glass fiber containing pellets or the carbon fiber containing pellets to produce the fiber reinforced composition, because of the same reason as described above.

As described above, a preferable method for producing the polypropylene resin composition of the present invention may include a method in which, in the kneading step, the components other than the fiber (B) are kneaded prior to addition of the fiber (B). Accordingly, the polypropylene resin composition of the present invention can be produced by a simple production method.

2. Production Method and Use of Molded Article

The molded article of the present invention can be obtained by molding the polypropylene resin composition obtained by the above method according to a well-known molding method such as injection molding (including gas injection molding, dual color injection molding, core-back injection molding and sandwich injection molding), injection compression molding (press injection), extrusion molding, sheet molding and hollow molding. Among these, injection molding or injection compression molding is preferred.

The polypropylene resin composition of the present invention exhibits more excellent flame retardance and drip resistance than conventionally-known flame-retardant polyolefin resins, and not only satisfies the UL94-5V Standard but also exhibits excellent mechanical properties, weather resistance and moldability.

Though not clear, the present inventors consider that the expression mechanism would be as follows.

Specifically, in the polypropylene resin composition and its molded article of the present invention, the polytetrafluoroethylene (D) increases the melt tension of the composition and further, when the component (X) is used, the propylene polymer (X) has a long-chain branched structure and therefore remarkably improves the melt tension and exhibits the effect of drip resistance.

In addition, as the flame retardant, an organic flame retardant is used, and therefore, in particular, a phosphorus-containing flame retardant, especially a phosphate flame retardant thermally decomposes to give polymetaphosphoric acid in firing, and the resultant phosphoric acid layer forms a protective layer, and in addition, as a result of the dewatering effect of polymetaphosphoric acid, the resultant carbon coating film formed could block oxygen to exhibit a flame-retardant effect.

The melt flow rate (MFR) of the entire polypropylene resin composition of the present invention is generally within a range of from 0.05 to 100 g/10 min, preferably from 0.1 to 50 g/10 min, more preferably from 0.3 to 30 g/10 min, even more preferably from 0.5 to 20 g/10 min, especially preferably from 1 to 10 g/10 min. When the melt flow rate (MFR) of the entire polypropylene resin composition of the present invention is made to fall within the range, the polypropylene resin composition of the present invention can keep good moldability, and especially in injection molding, the characteristic can be preferably exhibited. MFR is a value measured according to "Materials for molding and extrusion of plastic-polypropylene (PP)—Part 2: How to prepare test pieces and determine the properties thereof" in JIS K6921-2 (2005), under a test condition of 230° C. and a load of 2.16 kg.

The polypropylene resin composition of the present invention has good flexural modulus and flexural strength and has high impact strength, and this means that the molded article thereof has good mechanical strength. The polypropylene resin composition of the present invention contains as an indispensable component the polytetrafluoroethylene resin (D) and preferably contains the polypropylene resin (X) having a long-chain branched structure, and therefore can be considered to have good and well-balanced mechanical properties. In this description, the flexural modulus and flexural strength are evaluated based on the value measured at 23° C. according to JIS K7203 (1995), and the Charpy impact strength (notched) is measured based on the value measured at 23° C. according to JIS K7111 (2006).

The polypropylene resin composition of the present invention hardly discolors, and this means that the molded article thereof realizes good yellowing resistance during molding. The polypropylene resin composition of the present invention contains, as an indispensable component, the polytetrafluoroethylene resin (D) and preferably contains the polypropylene resin (X) having a long-chain branched structure. With that, the composition contains as another indispensable component, the organic flame retardant (C), and is characterized in that its yellowing resistance does not lower, that is, it hardly discolor (its yellowing resistance does not worsen) especially in a case where a phosphorus-containing flame retardant is used as the organic flame retardant (C). The evaluation method for discoloration (yellowing resistance) in this description is as shown in the section of Examples to be given hereinunder.

The polypropylene resin composition and its molded article of the present invention contains the fiber (B), and therefore has extremely high flame retardance in addition to the excellent mechanical properties, weather resistance and moldability thereof, and can be favorably used for automobile parts, electric parts, container packaging pans, building parts, large-size parts, etc.

EXAMPLES

Next, the present invention is described concretely with reference to Examples, but the present invention is not limited by these Examples. In Examples and Comparative Examples, the physical properties of the polypropylene resin composition or its constituent components were measured and evaluated according to the following evaluation methods.

1. Evaluation Methods
1) Flame Retardance
1)-i UL94-5V

Using an injection molding machine [Toshiba Machine's IS100] at a cylinder temperature of 200 to 230° C. and a mold temperature of 40° C., test pieces for flame retardance evaluation were molded and evaluated according to the UL Standard 94-5V (thickness 2.0 mmt). When the decision could not satisfy the standard of 5VA UL94-5 V. "NG" is given.

1)-2 UL94-V

Using an injection molding machine [Toshiba Machine's IS100], test pieces for flame retardance evaluation were molded and evaluated according to the UL Standard 94-V (thickness 1.5 mmt or 3.0 mmt). When the decision could not satisfy the UL standard 94-V. "NG" is given.

2) Melt Flow Rate (MFR):

Melt flow rate is measured according to "Materials for molding and extrusion of plastic-polypropylene (PP)—Part 2: How to prepare test pieces and determine the properties thereof" in JIS K6921-2 (2005) (test condition: 230° C., load of 2.16 kg). The unit is g/10 min.

3) Measurement of Molecular Weight Distribution (Mw/Mn and Mz/Mw) by GPC

A concrete measurement method in GPC employed in the present invention is as mentioned below.

Apparatus: Waters' GPC (ALC/GPC 150C)
Detector: FOXBORO's MIRAN 1A IR Detector (measurement wavelength: 3.42 μm)
Column: Showa Denko's AD806M/S (×3)
Mobile phase solvent: orthodichlorobenzene (ODCB)
Measurement temperature: 140° C.
Flow rate: 1.0 ml/min
Injection amount: 0.2 ml
Preparation of sample: Using: ODCB (containing 0.5 mg/mL of BHT), a sample solution of 1 mg/mL is prepared, and dissolved at 140° C., taking about 1 hour.

For conversion from the retention volume obtained in GPC to the molecular weight, a standard polystyrene (PS) calibration curve previously prepared is used. Compounds of standard polystyrene to be used are all Tosoh's brands mentioned below.

F380, F288, F128, F80, F40, F20, F10, F4, F1, A5000, A2500, A1000

0.2 mL of a solution prepared by dissolving each compound in ODCB (containing 0.5 mg/mL of BHT) so as to be 0.5 mg/mL is injected to prepare a calibration curve. The calibration curve uses a cubic expression method obtained through approximation according to a least-squares method.

The viscosity equation $[\eta]=K \times M^\alpha$ to be used in conversion into the molecular weight uses the following numerical values.

PS: $K=1.38 \times 10^{-4}$, $\alpha=0.7$
PP: $K=1.03 \times 10^{-4}$, $\alpha=0.78$ 4) Melt Tension (MT)

Using Toyo Seiki Seisakusho's Capillograph, samples are analyzed under the following condition.

Capillary: diameter 2.0 mm, length 40 mm
Cylinder diameter: 9.55 mm
Cylinder extrusion rate: 20 mm/min
Take-up speed: 4.0 mm/min
Temperature: 230° C.

When MT is extremely high, the resin would break at a take-up speed of 4.0 m/min. In such a case, the take-up speed is lowered, and the tension at the highest speed at which the resin could be taken out is referred to as MT. The unit is gram.

5) Paraxylene Soluble Content (CXS)

2 g of a sample is dissolved in 300 ml of p-xylene (containing 0.5 mg/ml of BHT) at 130° C. to prepare a solution, and then left at 25° C. for 12 hours. Subsequently, the precipitated polymer is taken out through filtration, and p-xylene is evaporated away from the filtrate, and further the residue is dried under reduced pressure at 100° C. or 12 hours to recover a room temperature xylene-soluble component. The ratio of the weight of the recovered component to the weight of the tested sample [% by weight] is defined as CXS.

6) mm Fraction

The details of the measurement method for the ram fraction of 3 propylene unit chains through $^{13}$C-NMR are as follows.

375 mg of a sample is completely dissolved in 2.5 ml of deuterated 1,1,2,2-tetrachloroethane in an NMR sample tube (10φ), and then analyzed according to a proton complete decoupling method at 125° C. Regarding the chemical shift, the center peak of three peaks of deuterated 1,1,2,2-tetrachloroethane is set at 74.2 ppm. The chemical shift of the other carbon peaks is based on it.

Flip angle: 90 degrees
Pulse interval: 10 sec
Resonance frequency: 100 MHz or more
Cumulative number: 10,000 times or more
Observation range: −20 ppm to 179 ppm
Data point number: 32768

Analysis of the mm fraction is based on the $^{13}$C-NMR spectrum measured under the above-mentioned condition.

Macromolecules, Vol. 8, p. 687 (1975) and Polymer, Vol. 30, p. 1350 (1989) are referred to for spectral assignment. The mm fraction is determined according to the method described in paragraphs [0053] to [0065] in JP-A 2009-275207.

7) Branching Index g'

The branching index (g') is calculated as a ratio of the limiting viscosity ($[\eta]br$) of a sample of the polypropylene resin (X) having a long-chain branched structure, as measured with the following Viscometer, to the limiting viscosity ($[\eta]lin$) of a linear polymer (Japan Polypropylene's Novatec PP (registered trademark), Grade Code: FY6), as measured separately, ($[\eta]br/[\eta]lin$), according to the above-mentioned method.

As a GPC apparatus equipped with a differential refractometer (RI) and a viscosity detector (Viscometer), Waters' Alliance GPCV 2000 is used. As a light-scattering detector, a multiangle laser light scattering detector (MALLS), Wyatt Technology's DAWN-E is used. The detector is connected in an order of MALLS, RI and Viscometer. The mobile phase solvent is 1,2,4-trichlorobenzene (with BASF's antioxidant, Irganox 1076 added in an amount of 0.5 mg/mL).

The flow rate is 1 mL/min, and two columns of Tosoh's GMHHR-H(S) HT are used. The temperature in the column, the sample injection part and each detector is 140° C. The sample concentration is 1 mg/mL, and the injection amount (sample loop volume) is 0.21.75 mL.

8) Rate of Strain Hardening in Measurement of Elongation Viscosity ($\lambda$max (0.1))

The condition in elongation viscosity measurement is as follows.

Apparatus: Rheometric's Ares
Fixture: TA instrument's Extensional Viscosity Fixture
Measurement temperature: 180° C.
Strain rate: 0.1/sec
Formation of test piece: In press forming (Masada Seisakusho's AH-200, heating temperature: 180° C., cooling temperature: 25° C.), a sheet having a size of 18 mm×10 mm and a thickness of 0.7 mm is formed to be a sample piece for measurement.

9) Melting Point

Using a differential scanning calorimeter (DSC, Seiko Instruments' DSC6200), 5.0 mg of a sample is once heated up to 200° C. to clear the heat history thereof, then cooled down to 40° C. at a cooling rate of 10° C./mm, and again heated at a heating rate of 10° C./min, and during the process, the endothermic peak top temperature is referred to as the melting point.

10) Flexural Modulus

The flexural modulus is measured at 23° C. according to JIS K7203. The dimension of the molded article is 90×10×4 mm. The unit is MPa.

11) Bending Strength

The bending strength is measured at 23° C. according to JIS K7203. The dimension of the molded article is 90×10×4 mm. The unit is MPa.

12) Charpy Impact Strength (Notched)

The Charpy impact strength is measured at 23° C. according to JIS K7111. The unit is kJ/m$^2$.

13) Moldability

Using an injection molding machine "Toshiba's IS100", sheet test pieces (20×120×2 mmt) are molded under the following condition.

Cylinder temperature: 220° C.
Mold cooling temperature: 40° C.
Injection rate: 35 mm/sec
Filling time: 15 sec The molded test pieces are visually checked and evaluated according to the following evaluation criteria.

A: No short shot is seen. With no sink mark, the molded samples are good.
B: No short shot, but some sink mark is seen.
C: Short shot is seen.

14) Discoloration Test (Yellowing in Molding)

Yellowing resistance in molding is evaluated according to the following process.

(i) A sample is kept staying in the cylinder of an injection molding machine (Toshiba's IS100) at 220° C. for 30 minutes.

(ii) This is molded in a mode of steady molding (Toshiba's IS100, mold temperature: 40° C., injection rate: 35 mm/sec, filling time: 20 sec, cooling time: 30 sec) to produce test pieces (1 min in 1 cycle).

(iii) The test pieces are visually checked.

(Evaluation Standards)

A: Little discoloration is seen.
B: Some discoloration is seen.
C: Serious discoloration is seen.

2. Materials and Evaluations (1) Polypropylene resin (A)

(1-1) Polypropylene resin (Y)

(Y-1) Japan Polypropylene's NOVATEC PP series (as polypropylene homopolymer, MFR 40 g/10 min, isotactic pentad fraction (mmmm fraction) 0.98)

(1-2) Polypropylene resin (X) having long-chain branched structure (X-1): A polypropylene resin (X-1) having a long-chain branched structure produced in the following Production Example 1 was used.

(X-2): A polypropylene resin (X-2) having a long-chain branched structure produced in the following Production Example 2 was used.

Production Example 1

Synthesis Example 1 for Catalyst Component (A)

Synthesis of rac-dichloro[1,1'-dimethylsilylen-ebis{2-(5-methyl-2-furyl)-4-(4-i-propylphenyl)inde-nyl}]hafnium: (Synthesis of Component [A-1] (complex 1))

(1) Synthesis of 4-(4-i-propylphenyl)indene 15 g (91 mmol) of 4-i-propylphenylboronic acid and 200 ml of dimethoxyethane (DME) were added to a 500-ml glass reactor, a solution of cesium carbonate (90 g, 0.28 mol) and water (100 ml) was added, and 13 g (67 mmol) of 4-bromoindene and 5 g (4 mmol) of tetrakistriphenylphosphine palladium were added sequentially, and heated at 80° C. for 6 hours.

After left cooled, the reaction liquid was poured into 500 ml of distilled water, transferred into a separating funnel, and extracted with, diisopropyl ether. The ether layer was washed with saturated saline water, and dried with sodium sulfate. Sodium sulfate was filtered away, the solvent was evaporated away under reduced pressure, and the residue was purified through a silica gel column to give a colorless liquid of 4-(4-i-propylphenyl)indene, 15.4 g (yield 99%).

(ii) Synthesis of 2-bromo-4-(4-i-propylphenyl)indene 15.4 g (67 mmol) of 4-(4-i-propylphenyl)indene, 7.2 ml of distilled water and 200 ml of DMSO were put in a 500-ml glass reactor, and 17 g (93 mmol) of N-bromosuccinimide was gradually added thereto. This was kept stirred at room temperature for 2 hours, the reaction liquid was poured into 500 ml of water with ice, and extracted three times with 100 ml of toluene. The toluene layer was washed with saturated saline water, 2 g (11 mmol) of p-toluenesulfonic acid was added, and heated under refluxed for 3 hours with removing water. The reaction liquid was left cooled, washed with saturated saline water, and dried with sodium sulfate. Sodium sulfate was filtered away, the solvent was evaporated away under reduced pressure, and the residue was purified through silica gel column to give 19.8 g (yield 96%) of a yellow liquid of 2-bromo-4-(4-i-propylphenyl)indene.

(iii) Synthesis of 2-(5-methyl-2-furyl)-4-(4-i-propylphenyl)indene 6.7 g (82 mmol) of 2-methylfuran and 100 ml of DME were added to a 500-ml glass reactor, and cooled down to −70° C. in a dry ice/methanol bath. 51 ml (81 mmol) of 1.59 mold, n-butyllithium/n-hexane solution was dropwise added thereto, and stirred as such for 3 hours. This was cooled to −70° C., and 20 ml (87 mmol) of triisopropyl borate and 50 ml of DME were dropwise added thereto. After the addition, while gradually restored to room temperature, this was stirred overnight.

50 ml of distilled water was added to the reaction liquid for hydrolysis, and a solution of 223 g of potassium carbonate and 100 ml of water, and 19.8 g (63 mmol) of 2-bromo-4-(4-i-propylphenyl)indene were added sequentially thereto, heated at 80° C., and reacted for 3 hours while removing the low-boiling-point fractions.

After left cooled, the reaction liquid was poured into 300 ml of water, transferred into a separating funnel, extracted three times with diisopropyl ether, and the ether layer was washed with saturated saline water and dried with sodium sulfate. Sodium sulfate was filtered away, the solvent was evaporated away under reduced pressure, and the residue was purified through a silica gel column to give 19.6 g (yield 99%) of a colorless liquid, 2-(5-methyl-2-furyl)-4-(4-i-propylphenyl)indene.

(iv) Synthesis of dimethylbis(2-(5-methyl-2-furyl)-4-(4-i-propylphenyl)indenyl)silane 9.1 g (29 mmol) of 2-(5-methyl-2-furyl)-4-(4-i-propylphenyl)indene and 200 ml of THF were added to a 500-ml glass reactor, an cooled down to −70° C. in a dry ice/methanol bath. 17 ml (28 mmol) of 1.66 mold, n-butyllithium/hexane solution was dropwise added thereto, and stirred as such for 3 hours. After this was cooled to −70° C., 0.1 ml (2 mmol) of 1-methylimidazol and 1.8 g (14 mmol) of dimethyldichlorosilane were added sequentially and, while gradually restored to room temperature, this was stirred overnight.

Distilled water was added to the reaction liquid, transferred into a separating furnace, washed with saline water until it became neutral, then sodium sulfate was added to dry the reaction liquid. Sodium sulfate was filtered away, the solvent was evaporated away wider reduced pressure, and the residue was purified through a silica gel column to give 8.6 g (yield 88%) of a pale yellow solid, dimethylbis(2-(5-methyl-2-furyl)-4-(4-i-propylphenyl)indenyl)silane.

(v) Synthesis of dichloro[1,1'-dimethylsilylenebis{2-(5-methyl-2-furyl)-4-(4-i-propylphenyl)indenyl}]hafnium 8.6 g (13 mmol) of dimethylbis(2-(5-methyl-2-furyl)-4-(4-i-propylphenyl)indenyl)silane and 300 ml of diethyl ether were added to a 500-ml glass reactor, and cooled down to −70° C. in a dry ice/methanol bath. 15 ml (25 mmol) of 1.66 mol/L n-butyllithium/hexane solution was dropwise added thereto and stirred for 3 hours. The solvent was evaporated away from the reaction liquid under reduced pressure, and 400 ml of toluene and 40 ml of diethyl ether were added and cooled down to −70° C. in a dry ice/methanol bath. 4.0 g (13 mmol) of hafnium tetrachloride was added thereto. Subsequently, while gradually restored to room temperature, this was stirred overnight.

The solvent was evaporated away under reduced pressure, and the residue was recrystallized from dichloromethane/hexane to give 7.6 g (yield 65%) of a racemic form of dichloro[1,1'-dimethylsilylenebis{2-(5-methyl-2-furyl)-4-(4-i-propylphenyl)indenyl}]hafnium as a yellow crystal.

Identified values of the resultant racemic body in $^1$-NMR are shown below. Identification results in $^1$H-NMR (C6D6)

Racemic body: δ 0.95 (s, 6H), δ 1.10 (d, 12H), δ 2.08 (s, 6H), δ 2.67 (m, 2H), δ 5.80 (d 2H), δ 6.37 (d, 2H), δ 6.74 (dd, 2H), δ 7.07 (d, 2H), δ 7.13 (d, 4H), δ 7.28 (s, 2H), δ 7.30 (d, 2H), δ 7.83 (d, 4H).

Synthesis Example 2 for Catalyst Component (A)

Synthesis of rac-dichloro[1,1'-dimethylsilylenebis{2-methyl-4-(4-chlorophenyl)-4-hydroazurenium}]hafnium: (Synthesis of Component [A-1] (Complex 2))

Rac-dichloro[1,1'-dimethylsilylenebis{2-methyl-4-(4-chlorophenyl)-4-hydroazurenium}]hafnium was synthesized in the same manner as that for the method described in Example 1 in JP-A 11-240909.

Catalyst Synthesis Example 1

(i) Chemical Treatment for Ion-Exchanging Layer Silicate

In a separable flask, 96% sulfuric acid (668 g) was added to 2,264 g of distilled water, and then as a layer silicate, 4 L of montmorillonite (Mizusawa Industrial Chemicals' Benclay SL: mean particle size 1.9 μm) was added thereto. The slurry was heated at 90° C. for 210 minutes. After 4,000 g of distilled water was added thereto, the reaction slurry was filtered to give 810 g of a cakey solid.

Next, in a separable flask, 432 g of lithium sulfate and 1,924 g of distilled water were added to prepare an aqueous lithium sulfate solution, and the entire amount of the cakey solid was put thereinto. The resultant slurry was reacted at room temperature for 120 minutes. 4 L of distilled water was added to the slurry, then filtered, and further washed with distilled water until pH of from 5 to 6, and filtered to give 760 g of a cakey solid.

The resultant solid was predried one full day at 100° C. in a nitrogen stream atmosphere, then coarse particles of 53 μm or more were removed, and further, this was dried under reduced pressure at 200° C. for 2 hours to give 220 g of a chemically-processed smectite.

The composition of the chemically-processed smectite was Al: 6.45% by weight, Si: 38.30% by weight, Mg: 0.98% by weight, Fe: 1.88% by weight, Li: 0.16% by weight, in which Al/Si=0.175 [mol/mol].

(ii) Catalyst Preparation and Prepolymerization

In a three-neck flask (volume 1 L), 20 g of the chemically-processed smectite obtained in the above was put, and heptane (132 mL) was added to form a slurry, and triisobutylaluminium (25 mmol: 68.0 mL of heptane solution having a concentration of 143 mg/mL) was added and stirred for 1 hour, then washed with heptane to have a residual liquid rate of 1/100, and heptane was added so as to make the total volume 100 mL.

In a separate flask (volume 200 mL), rac-dichloro[1,1'-dimethylsilylenebis{2-(5-methyl-2-furyl)-4-(4-i-propylphenyl)indenyl}]hafnium (210 μmol) produced in the above-mentioned Synthesis Example 1 for catalyst component (A) was dissolved in toluene (42 mL) (solution 1), and further in a separate flask (volume 200 mL), rac-dichloro[1,1'-dimethylsilylenebis{2-methyl-4-(4-chlorophenyl)-4-hydroazurenium}]hafnium (90 μmol) produced in the above-mentioned Synthesis Example 2 for catalyst component (A) was dissolved in toluene (18 mL) (solution 2).

Triisobutylaluminium (0.84 mmol; 1.2 mL of heptane solution having a concentration of 143 mg/mL) was added to the previous 1-L flask containing the chemically-processed smectite therein, and then the solution 1 was added and stirred at morn temperature for 20 minutes. Subsequently, further, triisobutylaluminium (0.36 mmol: 0.50 mL of heptane solution having a concentration of 143 mg/mL) was added, and then the above solution 2 was added and stirred at room temperature for 1 hour.

Subsequently, 338 mL of heptane was added, and the resultant slurry was introduced into a 1-L autoclave.

The internal temperature of the autoclave was made 40° C., then propylene was fed at a rate of 10 g/hr, and prepolymerized while kept at 40° C. for 4 hours. Subsequently, propylene feeding was stopped, and the remaining polymerization was carried out for 1 hour. The supernatant of the resultant catalyst slurry was removed through decantation, and triisobutylaluminium (6 mmol: 17.0 mL of heptane solution having a concentration of 143 mg/mL) was added to the remaining part and stirred for 5 minutes.

The solid was dried under reduced pressure for 1 hour to give 52.8 g of a dry pre-polymerized catalyst. The prepolymerization degree (value calculated by dividing the prepolymerized polymer amount by the solid catalyst amount) was 1.64.

Hereinafter this is referred to as "prepolymerized catalyst 1".

<Polymerization>

A stirring autoclave having an inner volume of 200 liters was fully purged with propylene, and then 40 kg of fully dewatered liquefied propylene was introduced thereinto 4.4 liters (as a volume in a standard state) of hydrogen and 470 ml (0.12 mol) of triisobutylaluminium-heptane solution were added thereto, and the inner temperature was elevated up to 70° C. Next, 2.4 g of the prepolymerized catalyst (as a weight except the prepolymerized polymer) was introduced under pressure of argon to start polymerization, and the inner temperature was kept at 70° C. After 2 hours, 100 ml of ethanol was introduced under pressure to purge the unreacted propylene, and the autoclave was purged with nitrogen to stop the polymerization.

The resultant polymer was dried in a nitrogen stream atmosphere at 90° C. for 1 hour to give 16.5 kg of a polymer (hereinafter referred to as "XX").

The catalyst activity was 6880 (g-XX/g-cat). MFR was 1.0 g/10 min.
[Production of X-1]

100 parts by weight of the polypropylene resin (XX) having a long-chain branched structure that had been produced in Production Example 1 was mixed with 0.125 parts by weight of a phenolic antioxidant, tetrakis[methylene-3-(3',5'-di-t-butyl-4'-hydroxyphenyl)propionate]methane (trade name: IRGANOX 1010, manufactured by BASF Japan), and 0.125 parts by weight of a phosphite antioxidant, tris(2,4-di-t-butylphenyl) phosphite (trade name: IRGAFOS 168, manufactured by BASF Japan), and using a high-speed stirring mixer (Henschel mixer, trade name), these were mixed at room temperature for 3 minutes, and then melt-kneaded through a twin-screw extruder to give pellets of the polypropylene resin (X-1) having a long-chain branched structure.

These pellets (X-1) were evaluated in point of the melting point, MFR, the paraxylene soluble content (CXS), GPC (Mw/Mn and Mz/Mw), the branching index (mm), the melt tension (MT), and the rate of strain hardening in measurement of elongation viscosity (λmax (0.1)). The evaluation results are shown in Table 1.

Production Example 2

According to the same operation as in [Production Example 1] except that, in the <polymerization> operation in [Production Example 1], 45 kg of fully dewatered liquefied propylene was introduced, 10.0 liters of hydrogen (as a volume in a standard state) was added thereto, and 2.04 g of the prepolymerized catalyst 1 (weight except the prepolymerized polymer) was introduced under pressure to start the polymerization, the resultant polymer was dried in a nitrogen stream atmosphere at 90° C. for 1 hour to give 18.0 kg of a polymer (hereinafter referred to as "XXX"). The catalyst activity was 8800 (g-XXX/g-cat), and MFR was 10.0 g/10 min.

The additives were similarly added to the resultant, the polypropylene resin (XXX) having a long-chain branched structure, and the evaluation results of the resultant (X-2) are shown in Table 1.

TABLE 1

|  | Unit | Polypropylene resin (X) having a long-chain branched structure | |
|---|---|---|---|
|  |  | (X-1) | (X-2) |
| MFR | g/10 min | 1.0 | 10.0 |
| Mw/Mn | — | 4.2 | 4.1 |
| Mz/Mw | — | 3.7 | 3.6 |
| Melt tension (MT) | g | 23.3 | 3.2 |
| log (MT) | — | 1.4 | 0.5 |
| −0.9 × log(MFR) + 0.7 | — | 0.7 | −0.2 |
| Ratio of CXS | wt % | 0.1 | 0.4 |
| Melting point | ° C. | 154.2 | 155.1 |
| mm fraction | % | 98.4 | 98.0 |

TABLE 1-continued

|  | Unit | Polypropylene resin (X) having a long-chain branched structure | |
|---|---|---|---|
|  |  | (X-1) | (X-2) |
| Branching index (g) | — | 0.9 | 0.9 |
| λmax | — | 12.0 | 10.0 |

(2) Fiber (B)
(B-1) Nippon Electric Glass's glass fiber: T480 (chopped strand, fiber diameter 13 μm, length 4 mm)
(3) Organic Flame Retardant (C)
(C-1) ADEKA's FP2200 [phosphorus-containing flame retardant]
(4) Polytetrafluoroethylene Resin (D)
(D-1) Daikin Industries' PTFE: Polyflon FA500H (unmodified, PTFE content 100% by weight)
(5) Other Additives (E)

As other additives (E), used were an antioxidant (E-1: BASF's IRGANOX 1010), (E-2: ADEKA's PEP 36), a neutralizing agent (E-3: NOF's calcium stearate) and a surfactant (E-4: Mitsubishi Chemical's maleic acid-modified polypropylene: CMPP2).

Examples 1 to 16, Comparative Examples 1 to 4

To 100 parts by weight of a total of the polypropylene resin (A) (polypropylene resin (Y), polypropylene resin (X) having a long-chain branched structure), the fiber (B) and the organic flame retardant (C), the polytetrafluoroethylene resin (D) was added in the ratio shown in Table 2, Table 3 and Table 4, and further, additional additives of the antioxidants (E-1: BASF's IRGANOX 1010) and (E-2, ADEKA's PEP36), the neutralizing agent (E-3: NOF's calcium stearate) and the surfactant (E-4: Mitsubishi Chemical's maleic acid-modified polypropylene: CMPP2) were in the ratio shown in Table 2, Table 3 and Table 4, and using a high-speed stirring mixer (Henschel mixer, trade name), these were mixed at room temperature for 3 minutes. Subsequently, the resultant mixture was melt-kneaded and extruded through a twin-screw extruder, led to pass through a cold water tank, and the strands were cut with a strand cutter to give pellets. Here, the compositional ratio of each component shown in Table 2, Table 3 and Table 4 is all in terms of part by weight. The ratio of the polypropylene resin (Y) to the polypropylene resin (X) having a long-chain branched structure (provided that the total of the polypropylene resin (Y) and the polypropylene resin (X) having a long-chain branched structure is 100% by weight) is shown in the parenthesis in the column of the polypropylene resin (Y) and the polypropylene resin (X) having a long-chain branched structure.

The resultant pellets were evaluated according to the above-mentioned evaluation methods. The evaluation results are shown in Table 2, Table 3 and Table 4.

Comparative Example 5

In the same manner as in the above-mentioned Examples except that, in these Examples, a commercial product, flame-retardant ABS resin (Techno Polymer's F5450, containing flame retardant and various additives) was used in place of the polypropylene resin (A) (polypropylene resin (X) having a long-chain branched structure, polypropylene resin (Y)), the fiber (B), the organic flame retardant (C), the polytetrafluoroethylene resin (D), the antioxidants (E-1) and (E-2), the neutralizing agent (E-3) and the surfactant (E-4), and evaluated. Here, the melt flow rate of the sample could not be measured since the flowability of the entire resin composition was poor in the evaluation method for melt flow rate taken in the present invention.

Comparative Example 6

In the same manner as in Comparative Example 5 except that, in Comparative Example 5, a commercial product, flame-retardant polycarbonate resin (PC resin) (Idemitsu Kosan's RY1900, containing flame retardant and various additives) was used in place of the flame-retardant ABS resin. Here, the melt flow rate of the sample could not be measured since the flowability of the entire resin composition was poor in the evaluation method for melt flow rate taken in the present invention.

Comparative Example 7

In the same manner as in Comparative Example 5 except that, in Comparative Example 5, a commercial product, glass fiber-containing flame-retardant ABS resin (Toray's 855VG20, containing 20% by weiaht of glass fiber, flame retardant and various additives) was used in place of the flame-retardant ABS resin. Here, the melt flow rate of the sample could not be measured since the flowability of the entire resin composition was poor in the evaluation method for melt flow rate taken in the present invention.

TABLE 2

| | | | Example 1 | Example 2 | Example 3 | Example 4 | Example 5 | Comparative Example 1 | Comparative Example 2 |
|---|---|---|---|---|---|---|---|---|---|
| Polypropylene resin (A) | Polypropylene resin (Y) | Y-1 | 45.0 (100 wt %) | 45.0 (100 wt %) | 22.5 (50 wt %) | 22.5 (50 wt %) | 12.0 (30 wt %) | 45.0 (100 wt %) | 45.0 (100 wt %) |
| | Polypropylene resin (X) | X-1 | — | — | 22.5 (50 wt %) | 22.5 (50 wt %) | 28.0 (70 wt %) | — | — |
| | having a long-chain branched structure | X-2 | — | — | — | — | — | — | — |
| Fiber (B) | Glass fiber | B-1 (T480 (13 μm)) | 30.0 | 30.0 | 30.0 | 30.0 | 30.0 | 30.0 | 30.0 |
| Organic flame retardant (C) | Phosphorus-containing flame retardant | C-1 (FP2200) | 25.0 | 25.0 | 25.0 | 25.0 | 30.0 | 25.0 | 25.0 |
| Polytetra-fluoro-ethylene resin (D) | PTFE | D-1 (FA500H) | 0.30 | 0.80 | 0.05 | 0.10 | 0.10 | — | 2.00 |
| Other additives (E) | Antioxidant | E-1 (IR1010) | 0.15 | 0.15 | 0.15 | 0.15 | 0.15 | 0.15 | 0.15 |
| | | E-2 (PEP36) | 0.30 | 0.30 | 0.30 | 0.30 | 0.30 | 0.30 | 0.30 |
| | Neutralizing agent | E-3 (calcium stearate) | 0.1 | 0.1 | 0.1 | 0.1 | 0.1 | 0.1 | 0.1 |
| | Surfactant | E-4 (CMPP2) | 1.5 | 1.5 | 1.5 | 1.5 | 1.5 | 1.5 | 1.5 |
| Evaluation results | UL94-V | 1.5 mmt | V0 | V0 | V0 | V0 | V0 | V0 | difficult to produce |
| | UL94-5V | 2.0 mmt | 5VA | 5VA | 5VA | 5VA | 5VA | NG | |
| | MFR | 230° C. | 2.8 | 1.8 | 1.5 | 1.5 | 0.6 | 3.2 | |
| | Flexural modulus | MPa | 9730 | 9780 | 9620 | 9660 | 9770 | 9425 | |
| | Flexural strength | MPa | 159 | 159 | 159 | 159 | 159 | 159 | |
| | Impact strength SI 23° C. | KJ/m2 | 7.60 | 6.50 | 8.20 | 8.04 | 7.90 | 9.00 | |
| | Moldability | | A | A | A | A | B | A | |
| | Molding discoloration | | A | A | A | A | B | A | |

TABLE 3

| | | | Example 6 | Example 7 | Example 8 | Example 9 | Comparative Example 3 | Comparative Example 4 |
|---|---|---|---|---|---|---|---|---|
| Polypropylene resin (A) | Polypropylene resin (Y) | Y-1 | 65.0 (100 wt %) | 55.0 (100 wt %) | 45.0 (50 wt %) | 22.5 (50 wt %) | 75.0 (100 wt %) | 65.0 (100 wt %) |
| | Polypropylene resin (X) | X-1 | — | — | — | 22.5 (50 wt %) | — | — |
| | having a long-chain branched structure | X-2 | — | — | — | — | — | — |

TABLE 3-continued

|  |  |  | Example 6 | Example 7 | Example 8 | Example 9 | Comparative Example 3 | Comparative Example 4 |
|---|---|---|---|---|---|---|---|---|
| Fiber (B) | Glass fiber | B-1 (T480 (13 μm)) | 10.0 | 20.0 | 30.0 | 30.0 | — | 10.0 |
| Organic flame retardant (C) | Phosphorus-containing flame retardant | C-1 (FP2200) | 25.0 | 25.0 | 25.0 | 25.0 | 25.0 | 25.0 |
| Polytetra-fluoro-ethylene resin (D) | PTFE | D-1 (FA500H) | 0.50 | 0.20 | 0.20 | 0.20 | 0.20 | — |
| Other additives (E) | Antioxidant | E-1 (IR1010) | 0.15 | 0.15 | 0.15 | 0.15 | 0.15 | 0.15 |
|  |  | E-2 (PEP36) | 0.30 | 0.30 | 0.30 | 0.30 | 0.30 | 0.30 |
|  | Neutralizing agent | E-3 (calcium stearate) | 0.1 | 0.1 | 0.1 | 0.1 | 0.1 | 0.1 |
|  | Surfactant | E-4 (CMPP2) | 0.5 | 1.0 | 1.5 | 1.5 | — | 0.5 |
| Evaluation results | UL94-V | 1.5 mmt | V0 | V0 | V0 | V0 | V0 | V0 |
|  | UL94-5V | 2.0 mmt | 5VA | 5VA | 5VA | 5VA | NG | NG |
|  | MFR | 230° C. | 4.7 | 4.5 | 2.3 | 1.2 | 13.6 | 5.8 |
|  | Moldability |  | A | A | A | A | A | A |
|  | Molding discoloration |  | A | A | A | A | A | A |

TABLE 4

| | | Example 10 | Example 11 | Example 12 | Example 13 | Example 14 | Example 15 | Example 16 | Comparative Example 5 | Comparative Example 6 | Comparative Example 7 |
|---|---|---|---|---|---|---|---|---|---|---|---|
| Polypropylene resin (A) | Polypropylene resin (Y) Y-1 | 65.0 (100 wt %) | 25.0 (56 wt %) | 25.0 (56 wt %) | 35.0 (54 wt %) | 35.0 (54 wt %) | 35.0 (54 wt %) | 35.0 (54 wt %) | ABS resin F5450 100 | PC resin RY1900 100 | ABS resin 855VG20 ABS 80 glass fiber 20 |
| | Polypropylene resin (X) X-1 | — | 20.0 (44 wt %) | 20.0 (44 wt %) | — | — | 30.0 (46 wt %) | 30.0 (46 wt %) | | | |
| | having a long-chain branched structure X-2 | — | — | — | 30.0 (46 wt %) | 30.0 (46 wt %) | — | — | | | |
| Fiber (B) | Glass fiber B-1 (T480 (13 μm)) | 10.0 | 30.0 | 30.0 | 10.0 | 10.0 | 10.0 | 10.0 | | | |
| Organic flame retardant (C) | Phosphorus-containing flame retardant C-1 (FP2200) | 25.0 | 25.0 | 25.0 | 25.0 | 25.0 | 25.0 | 25.0 | | | |
| Polytetrafluoro-ethylene resin (D) | PTFE D-1 (FA500H) | 0.30 | 0.05 | 0.20 | 0.05 | 0.20 | 0.05 | 0.20 | | | |
| Other additives (E) | Antioxidant E-1 (IR1010) | 0.20 | 0.20 | 0.20 | 0.20 | 0.20 | 0.20 | 0.20 | | | |
| | E-2 (PEP36) | 0.20 | 0.20 | 0.20 | 0.20 | 0.20 | 0.20 | 0.20 | | | |
| | Neutralizing agent E-3 (calcium stearate) | 0.1 | 0.1 | 0.1 | 0.1 | 0.1 | 0.1 | 0.1 | | | |
| | Surfactant E-4 (CMPP2) | 0.5 | 0.5 | 0.5 | 0.5 | 0.5 | 0.5 | 0.5 | | | |
| Evaluation results | UL94-V 1.5 mmt | V0 | V0 | V0 | V0 | V0 | V0 | V0 | V0 | V2 | HB |
| | UL94-5V 2.0 mmt | 5VA | 5VA | 5VA | 5VA | 5VA | 5VA | 5VA | 5VA | NG | 5VA |
| | MFR 230° C. | 9.9 | 2.8 | 2.4 | 6.3 | 5.7 | 4.3 | 3.5 | immeasurable | immeasurable | immeasurable |
| | Flexural modulus MPa | 4350 | 9240 | 9300 | 4200 | 4250 | 4400 | 4350 | 2085 | 2434 | 7774 |
| | Flexural strength MPa | 87 | 158 | 157 | 90 | 91 | 93 | 93 | 60 | 95 | 134 |
| | Impact strength SI 23° C. KJ/m2 | 4.20 | 8.50 | 8.30 | 4.20 | 3.90 | 4.70 | 4.20 | 8.64 | 14.10 | 4.62 |
| | Moldability | A | A | A | A | A | A | A | B | C | C |
| | Molding discoloration | A | A | A | A | A | A | A | C | C | C |

3. Evaluation Results

From the results in Table 2, Table 3 and Table 4, it is known that the polypropylene resin composition of the present invention using the tetrafluoroethylene resin (D) along with the polypropylene resin (A), the fiber (B) and the organic flame retardant (C) each in a specific amount therein exhibits extremely good flame retardance. Specifically, for attaining the "evaluation 5VA in UL94-5V" as the flame retardance evaluation index, it is necessary to satisfy both self-extinguishing property and drip resistance, and in Examples of the present invention, all the compositions attain the flame retardance evaluation in addition, incorporating the fiber (B) within the range defined in the present invention betters the mechanical properties of the resin compositions. Further, in Examples of the present invention, there occurred no failures such as moldability failure and outward appearance failure during molding, owing to complexation of components.

As compared with Examples 1 and 2, Comparative Examples 1 and 4 not using the tetrafluoroethylene resin (D) could not prevent dripping during firing and therefore could not realize satisfactory flame retardance. On the other hand, in Comparative Example 2, the amount of the tetrafluoroethylene resin (D) was too much to realize production. This is considered because the amount of the tetrafluoroethylene resin (D) was too much and therefore the melt ductility would have worsened though the melt tension increased.

On the other hand, as compared with polypropylene, the fiber (B) has good thermal conductivity, and therefore, in the absence of the fiber (B), the heat generated in firing would accumulate inside the resin so that the viscosity of the resin moiety is thereby rapidly lowered. Examples 7 and 8 are compared with Comparative Example 3. It is known that, even in the absence of the fiber (B), use of the tetrafluoroethylene resin (D) could prevent dripping against the heat quantity on a level of the UL94-V test, but when exposed to the heat quantity in the (UL94-5V test, use of the tetrafluoroethylene resin (D) could hardly prevent the dripping against the heat quantity in firing if the fiber (B) is not used. Also in the other Examples, it is obvious that the compositions satisfying the definition in the present invention can exhibit extremely good flame retardance.

Comparative Examples 5 to 7 using a resin except polypropylene are described. In Comparative Example 5 and Comparative Example 7 using the ABS resin, the flame retardance was relatively good, but since the flowability was not good, the moldability was poor and the products discolored during molding. On the other hand, in Comparative Example 6 using the polycarbonate resin, all the results of flame retardance, moldability and molding discoloration were unsatisfactory.

From these Examples and Comparative Examples, it is known that, for satisfying both high-level flame retardance of UL94-5 V and mechanical characteristics required in the present invention, it is indispensable to add a predetermined amount of the tetrafluoroethylene resin (D), the fiber (B) and the organic flame retardant (C) to the polypropylene resin (A).

INDUSTRIAL APPLICABILITY

The polypropylene resin composition of the present invention has excellent flame retardance in addition to excellent mechanical properties, moldability and weather resistance, and especially satisfies both self-extinguishing property and drip resistance, and therefore can attain "rating 5VA in UL94-5V" and can be favorably used for automobile parts, electric parts, container packaging parts, building components, large-size components, etc.

The invention claimed is:

1. A polypropylene resin composition comprising:
   a polypropylene resin (A) comprising
   at least one polypropylene resin (Y) selected from a group consisting of a propylene homopolymer, a propylene-α-olefin block copolymer, and a propylene-α-olefin random copolymer, which does not correspond to polypropylene resin (X) having a long-chain branched structure, and having a melt flow rate (MFR) (230° C., 2.16 kg load) of from 1.0 to 200 g/10 min, and
   optionally, a polypropylene resin (X) having a long-chain branched structure having i) a melt flow rate (MFR) (230° C., 2.16 kg load) of from 0.1 to 30.0 g/10 min, ii) a molecular weight distribution Mw/Mn through GPC of from 3.0 to 10.0 and Mz/Mw through GPC of from 2.5 to 10.0, iii) a melt tension (MT) (unit: g) satisfying the following: equations: $\log(MT) \geq 0.9 \times \log(MFR) + 0.7$, or $MT \geq 15$, and iv) a paraxylene-soluble fraction (CXS) at 25° C. is less than 5.0% by weight relative to the total amount of the polypropylene resin
   a fiber (B) comprising at least one fiber selected from the group consisting of glass fibers and carbon fibers;
   an organic flame retardant (C); and
   a polytetrafluoroethylene (D),
   wherein the polypropylene resin (A) is from 20 to 60 parts by weight, the fiber (B) is from 5 to 40 parts by weight, and the organic flame retardant (C) is from 18 to 40 parts by weight, provided that the total content of the polypropylene resin (A), the fiber (B), and the organic flame retardant (C) is 100 parts by weight, and the polytetrafluoroethylene resin (D) is from 0.01 to 1.5 parts by weight relative to 100 parts by weight of the total content of the polypropylene resin (A), the fiber (B), and the organic flame retardant (C).

2. The polypropylene resin composition according to claim 1,
   comprising from 70 to 99% by weight polypropylene resin (Y) and from 1 to 30% by weight polypropylene resin (X), provided that the total of the polypropylene resin (Y) and the polypropylene resin (X) having a long-chain branched structure is 100% by weight.

3. The polypropylene resin composition according to claim 1, wherein the organic flame retardant (C) is a phosphorus-containing flame retardant.

4. The polypropylene resin composition according to claim 1, wherein the fiber (B) is a glass fiber.

5. A molded article obtained by molding the polypropylene resin composition of claim 1.

* * * * *

UNITED STATES PATENT AND TRADEMARK OFFICE
CERTIFICATE OF CORRECTION

PATENT NO. : 10,233,317 B2
APPLICATION NO. : 15/515405
DATED : March 19, 2019
INVENTOR(S) : M. Kabeya et al.

It is certified that error appears in the above-identified patent and that said Letters Patent is hereby corrected as shown below:

In the Claims

Column 60, Line 31 please change "resin" to -- resin (X); --

Signed and Sealed this
Thirty-first Day of December, 2019

Andrei Iancu
*Director of the United States Patent and Trademark Office*